US008890786B2

(12) United States Patent
Moon et al.

(10) Patent No.: US 8,890,786 B2
(45) Date of Patent: Nov. 18, 2014

(54) METHOD OF DRIVING A DISPLAY PANEL AND DISPLAY DEVICE

(75) Inventors: Hoi-Sik Moon, Asan-si (KR); Yun-Seok Lee, Cheonan-si (KR); Chang-Soo Lee, Cheonan-si (KR); Jae-Han Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 620 days.

(21) Appl. No.: 13/114,187

(22) Filed: May 24, 2011

(65) Prior Publication Data

US 2012/0075281 A1 Mar. 29, 2012

(30) Foreign Application Priority Data

Sep. 24, 2010 (KR) ........................ 10-2010-0092819

(51) Int. Cl.
*G06F 3/038* (2013.01)
*G09G 3/00* (2006.01)
*G09G 3/36* (2006.01)

(52) U.S. Cl.
CPC .............. *G09G 3/003* (2013.01); *G09G 3/3614* (2013.01); *G09G 2310/061* (2013.01); *G09G 2300/0426* (2013.01); *G09G 3/3648* (2013.01)
USPC ................................ 345/96; 345/94; 345/212

(58) Field of Classification Search
CPC .................................................... G09G 3/3614
USPC ............................ 345/89–90, 92, 94, 96, 212
See application file for complete search history.

(56) References Cited

U.S. PATENT DOCUMENTS

| | | | | |
|---|---|---|---|---|
| 7,605,788 | B2 * | 10/2009 | Kamada et al. | 345/89 |
| 2008/0316161 | A1 * | 12/2008 | Song et al. | 345/95 |
| 2010/0045640 | A1 * | 2/2010 | Park et al. | 345/205 |

FOREIGN PATENT DOCUMENTS

| | | | |
|---|---|---|---|
| JP | 2006-084860 | A | 3/2006 |
| KR | 1020070109296 | A | 11/2007 |
| KR | 1020080056857 | A | 6/2008 |
| KR | 1020080088892 | A | 10/2008 |

* cited by examiner

*Primary Examiner* — Andrew Sasinowski
(74) *Attorney, Agent, or Firm* — Cantor Colburn LLP

(57) ABSTRACT

In a method of driving a display panel, a voltage of a first polarity with respect to a reference voltage is outputted to an n-th data line and an (n+1)-th data line ('n' is a natural number), respectively, and a voltage of a second polarity with respect to the reference voltage is outputted to an (n+2)-th data line and an (n+3)-th data line, respectively, during an N-th frame ('N' is a natural number). Then, a voltage of the first polarity is outputted to the n-th data line, a voltage of the second polarity is outputted to the (n+1)-th data line and the (n+2)-th data line, respectively, and a voltage of the first polarity is outputted to the (n+3)-th data line, during an (N+1)-th frame.

19 Claims, 19 Drawing Sheets

METHOD OF DRIVING A DISPLAY PANEL AND DISPLAY DEVICE

This application claims priority to Korean Patent Application No. 2010-0092819, filed on Sep. 24, 2010, and all the benefits accruing therefrom under 35 U.S.C. §119, the contents of which in its entirety are herein incorporated by reference.

BACKGROUND OF THE INVENTION

1. Field of the Invention

Exemplary embodiments of the present invention relate to a method of driving a display panel and a display device. More particularly, exemplary embodiments of the present invention relate to a method of driving a display panel capable of enhancing a display quality and a display device.

2. Description of the Related Art

Generally, a liquid crystal display ("LCD") device includes an LCD panel, a data driving part and a gate driving part. The LCD panel includes an array substrate, a color filter substrate and a liquid crystal layer. The array substrate includes a plurality of data lines, a plurality of gate lines, a plurality of switching elements and a plurality of pixel electrodes. For example, the array substrate includes I×J switching elements that are respectively connected to I data lines and J gate lines, and I×J pixel electrodes that are connected to the switching elements. In this case, 'I' and 'J' are natural numbers. The color filter substrate includes a plurality of color filters and a common electrode. Thus, the LCD panel includes I×J pixels. The data driving part provides I data lines with a data voltage, and the gate driving part sequentially provides J gate lines with J gate signals. Thus, the LCD panel including I×J pixels is driven.

Recently, in order to enhance a motion blur of a motion image, a technology, which drives the LCD panel in a high speed frame frequency by increasing a frame rate, has been employed. In this case, a time which is required to charge a pixel with a data voltage is decreased. Moreover, a time, which is required to return a common voltage applied to a common electrode opposite to a pixel electrode receiving the data voltage, is decreased. Thus, when a vertical strip pattern is displayed on the display panel, image distortions such as a greenish phenomenon, vertical-line defects, etc., are generated.

BRIEF SUMMARY OF THE INVENTION

Exemplary embodiments of the present invention provide a method of driving a display panel capable of enhancing a display quality.

Exemplary embodiments of the present invention also provide a display device capable of enhancing a display quality.

According to one exemplary embodiment of the present invention, there is provided a method of driving a display panel. In the method, a voltage of a first polarity with respect to a reference voltage is outputted to an n-th data line and an (n+1)-th data line ('n' is a natural number), respectively, and a voltage of a second polarity with respect to the reference voltage is outputted to an (n+2)-th data line and an (n+3)-th data line, respectively, during an N-th frame ('N' is a natural number). Then, a voltage of the first polarity is outputted to the n-th data line, a voltage of the second polarity is outputted to the (n+1)-th data line and the (n+2)-th data line, respectively, and a voltage of the first polarity is outputted to the (n+3)-th data line, during an (N+1)-th frame.

According to another exemplary embodiment of the present invention, there is provided a method of driving a display panel. In the method, a voltage of a first polarity with respect to a reference voltage is outputted to an n-th data line and an (n+1)-th data line ('n' is a natural number), respectively, and a voltage of a second polarity with respect to the reference voltage is outputted to an (n+2)-th data line and an (n+3)-th data line, respectively, during an N-th frame and an (N+1)-th frame ('N' is a natural number). Then, a voltage of the first polarity is outputted to the n-th data line, a voltage of the second polarity is outputted to the (n+1)-th data line and the (n+2)-th data line, respectively, and a voltage of the first polarity is outputted to the (n+3)-th data line, during an (N+2)-th frame and an (N+3)-th frame.

According to still another exemplary embodiment of the present invention, a display device includes a display panel and a data driving part. The display panel includes a plurality of data lines, a plurality of gate lines crossing the data lines, and a plurality of pixels electrically connected to the data and gate lines. The data driving part is configured to output a voltage of a first polarity with respect to a reference voltage to an n-th data line and an (n+1)-th data line ('n' is a natural number), respectively, and to output a voltage of a second polarity with respect to the reference voltage to an (n+2)-th data line and an (n+3)-th data line, respectively, during an N-th frame ('N' is a natural number). The data driving part is further configured to output a voltage of the first polarity to the n-th data line, to output a voltage of the second polarity to the (n+1)-th data line and the (n+2)-th data line, respectively, and to output a voltage of the first polarity to the (n+3)-th data line, during an (N+1)-th frame.

According to still another exemplary embodiment of the present invention, a display device includes a display panel and a data driving part. The display panel includes a plurality of data lines, a plurality of gate lines crossing the data lines, and a plurality of pixels electrically connected to the data and gate lines. The data driving part is configured to output a voltage of a first polarity with respect to a reference voltage to an n-th data line and an (n+1)-th data line ('n' is a natural number), respectively, and to output a voltage of a second polarity with respect to the reference voltage to an (n+2)-th data line and an (n+3)-th data line, respectively, during an N-th frame and an (N+1)-th frame ('N' is a natural number). The data driving part is further configured to output a voltage of the first polarity to the n-th data line, to output a voltage of the second polarity to the (n+1)-th data line and the (n+2)-th data line, respectively, and to output a voltage of the first polarity to the (n+3)-th data line, during an (N+2)-th frame and an (N+3)-th frame.

According to yet another exemplary embodiment of the present invention, a display device includes a display panel and a data driving part. The display panel includes a pixel column. The display panel also includes a plurality of data lines, a plurality of connection lines each connecting two data lines, and a plurality of pixels within the pixel column disposed between two data lines to be electrically connected to one of the two data lines. The data driving part is connected to output terminals of the connection lines to output data voltages to the connection lines.

According to some exemplary embodiments of the present invention, display defects such as a greenish phenomenon due to a voltage variation of data lines, vertical-line defects due to a disuniform luminance distribution, a crosstalk, etc., may be prevented. In addition, when a 3D image is displayed thereon, polarities of left-eye data voltages are inverted by a predetermined period and polarities of right-eye data voltages are inverted by a predetermined period. Thus, it prevents an after-image from being generated.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
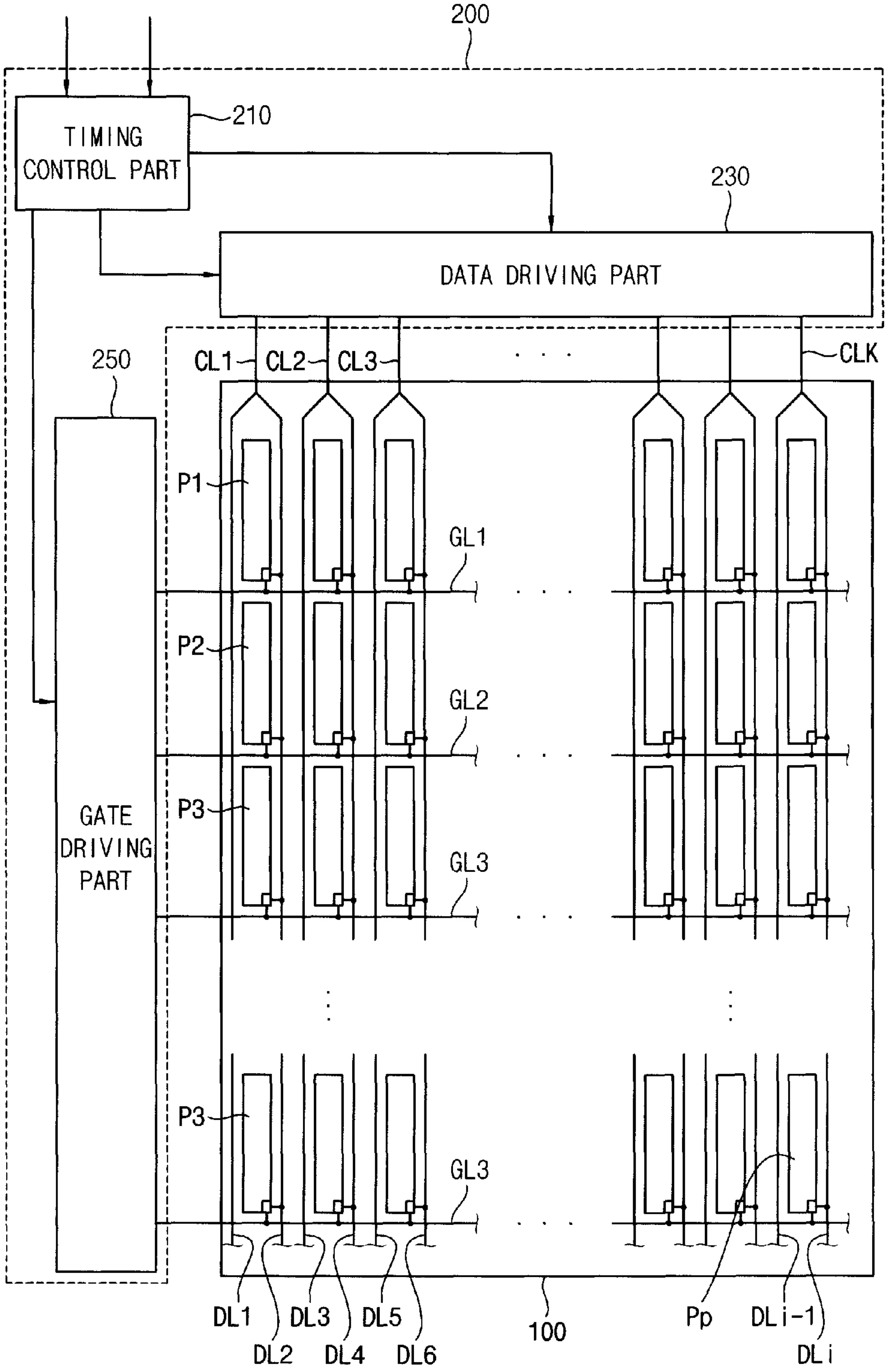
FIG. 1 is a plan view illustrating an exemplary embodiment of a display device according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present invention will be explained in detail with reference to the accompanying drawings.

FIG. 1 is a plan view illustrating an exemplary embodiment of a display device according to the present invention.

Referring to FIG. 1, a display device includes a display panel 100 and a panel driving part 200 which drives the display panel 100. The panel driving part 200 includes a timing control part 210, a data driving part 230 and a gate driving part 250. The panel driving part 200 drives the display panel 100 in a high driving frequency. For example, the display panel 100 may be driven in a driving frequency of no less than about 120 Hz.

The display panel 100 includes an array substrate (not shown), an opposite substrate (not shown) opposite to the array substrate and a liquid crystal layer (not shown) interposed between the array substrate and the opposite substrate. The display panel 100 may include a plurality of pixels P1, P2, P3, . . . , Pp that are arranged in a matrix shape. The array substrate includes a plurality of data lines DL1, DL2, DL3, DL4, . . . , DLi−1 and DLi, a plurality of connection lines CL1, CL2, CL3, . . . , CLk, and a plurality of gate lines GL1, GL2, GL3, . . . , GLq. In this case, 'p', 'i', 'k' and 'q' are natural numbers.

The data lines DL1, DL2, DL3 DL4, . . . , DLi−1 and DLi extend in a first direction D1 to be arranged in a second direction D2, the second direction D2 crossing the first direction D1. The connection lines CL1, CL2, CL3, . . . , CLk electrically connect a couple of data lines to each other. For example, a first data line DL1 and a second data line DL2 are electrically connected to a first connection line CL1, and are connected to an output terminal of the data driving part 230. The gate lines GL1, GL2, GL3, . . . , GLq are extended in the second direction D2, and are arranged in the first direction D1. A first pixel P1, a second pixel P2 and a third pixel P3 are disposed between the first and second data lines DL1 and DL2, and are electrically connected to the first and second data lines DL1 and DL2. The first pixel P1 is connected to the first gate line GL1, the second pixel P2 is connected to the second gate line GL2, and the third pixel P3 is connected to the third gate line GL3. Each of the pixels has a 1G1D structure in which one gate line and one data line are connected to each other.

The timing control part 210 controls an operation of the data driving part 230 and the gate driving part 250. The timing control part 210 provides the data driving part 230 with a data signal in correspondence with a pixel structure of the display panel 100 per a unit of a horizontal period (1H).

The data driving part 230 converts data signal provided from the timing control part 210 into a data voltage of an analog type, and outputs the data voltage of the analog type to the connection lines CL1, CL2, CL3, . . . , CLk. The data voltages are supplied to the data lines DL1, DL2, DL3, DL4, . . . , DLi−1 and DLi through the connection lines CL1, CL2, CL3, . . . , CLk. The data driving part 230 outputs a data voltage of a polarity in which a two-dot inversion method is adapted. When the two-dot inversion method is adapted thereto, the data driving part 230 may output data voltages of polarities such as negative (−), −, positive (+), +, −, −, +, +, etc. Moreover, the data driving part 230 inverts a polarity of the data voltage using a column inversion method per a unit of the horizontal period. In this case, a voltage of a first polarity (+) may be higher than a reference voltage, such as Vcom, and a voltage of a second polarity (−) may be lower than the reference voltage.

The gate driving part 250 generates a plurality of gate signals in accordance with a control signal of the timing control part 210, and the gate driving part 250 sequentially provides the gate lines GL1, GL2, GL3, . . . , GLq with the gate signals.

Figure 2:
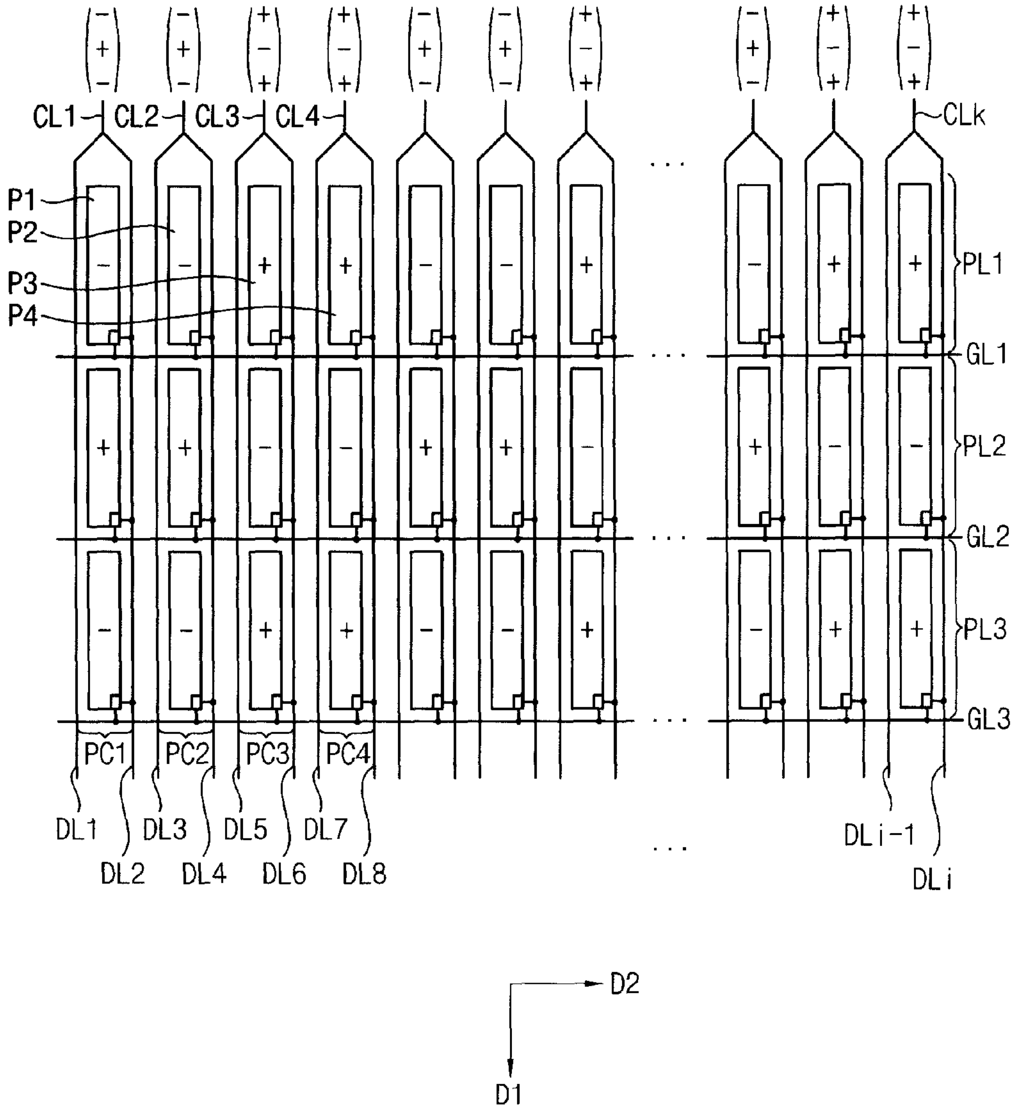
FIG. 2 is a schematic diagram explaining an inversion driving of an exemplary embodiment of a display panel of FIG. 1.

FIG. 2 is a schematic diagram explaining an inversion driving of an exemplary display panel of FIG. 1.

Referring to FIGS. 1 and 2, the data driving part 230 inverts a plurality of data voltages using at least one of a 2-dot inversion method, a column inversion method and a frame inversion method to output an inverted data voltage through a plurality of output terminals. The data voltages are applied to a plurality of data lines DL1, DL2, DL3, . . . , DLi−1 and DLi ('i' is a natural number) through a plurality of connection lines CL1, CL2, CL3, . . . , CLk ('k' is a natural number). The data driving part 230 outputs data voltages in a polarity sequence such as −, −, +, +, −, −, +, +, . . . , etc., during an odd numbered horizontal period of an N-th frame (N is a natural number), and outputs data voltages in a polarity sequence such as +, +, −, −, +, +, −, −, . . . , etc., during an even numbered horizontal period of the N-th frame. Moreover, the data driving part 230 outputs data voltages in a polarity sequence such as +, +, −, −, +, +, −, −, . . . , etc., during an odd numbered horizontal period of an (N+1)-th frame, and outputs data voltages in a polarity sequence such as −, −, +, +, −, −, +, +, . . . , etc., during an even numbered horizontal period of the (N+1)-th frame. In this case, the odd numbered horizontal period is an interval in which a gate signal is applied to an odd numbered gate line, and the even numbered horizontal period is an interval in which a gate signal is applied to an even numbered gate line.

In an exemplary embodiment, a data voltage of a second polarity is applied to the first and second data lines DL1 and DL2 that are connected to the first connection line CL1. Pixels of a first pixel column PC1 are disposed between the first and second data lines DL1 and DL2. The pixels of the first pixel column PC1 receive a voltage of a same polarity and a same level as a data voltage applied to the first and second data lines DL1 and DL2.

A data voltage of a second polarity is applied to the third and fourth data lines DL3 and DL4 that are connected to the second connection line CL2. Pixels of a second pixel column PC2 are disposed between the third and fourth data lines DL3 and DL4. The pixels of the second pixel column PC2 receive a voltage of a same polarity and a same level as a data voltage applied to the third and fourth data lines DL3 and DL4.

A data voltage of a first polarity is applied to the fifth and sixth data lines DL5 and DL6 that are connected to the third connection line CL3. Pixels of a third pixel column PC3 are disposed between the fifth and sixth data lines DL5 and DL6. The pixels of the third pixel column PC3 receive a voltage of a same polarity and a same level as a data voltage applied to the fifth and sixth data lines DL5 and DL6.

A data voltage of a first polarity is applied to the seventh and eighth data lines DL7 and DL8 that are connected to the fourth connection line CL4. Pixels of a fourth pixel column PC4 are disposed between the seventh and eighth data lines DL7 and DL8. The pixels of the fourth pixel column PC4 receive a voltage of a same polarity and a same level as a data voltage applied to the seventh and eighth data lines DL7 and DL8.

When viewing a second pixel P2 of the second pixel column PC2, the same polarity voltage is applied to the second pixel P2, which is equal to a polarity of a voltage applied to the third and fourth data lines DL3 and DL4 disposed at two opposing sides of the second pixel P2. Thus, a coupling due to a voltage variation of the third and fourth data lines DL3 and DL4 is not generated at a pixel electrode of the second pixel P2. Moreover, an inverted polarity voltage is applied to a third pixel P3 adjacent to the second pixel P2, which is inverted with respect to a polarity of the second pixel P2 in accordance with a two-dot inversion method. Thus, a coupling in accordance with a polarity variation between the second pixel P2 and the third pixel P3 may be offset with each other.

Thus, a distortion of an adjacent pixel, which is generated in accordance with a voltage variation of the data line in a vertical blank interval between an N-th frame and an (N+1)-th frame, may be prevented. Moreover, a voltage distortion between adjacent pixels may be offset with each other. Accordingly, display defects such as a greenish phenomenon, vertical-line defects, etc., generated due to a voltage variation may be prevented.

Figure 3:
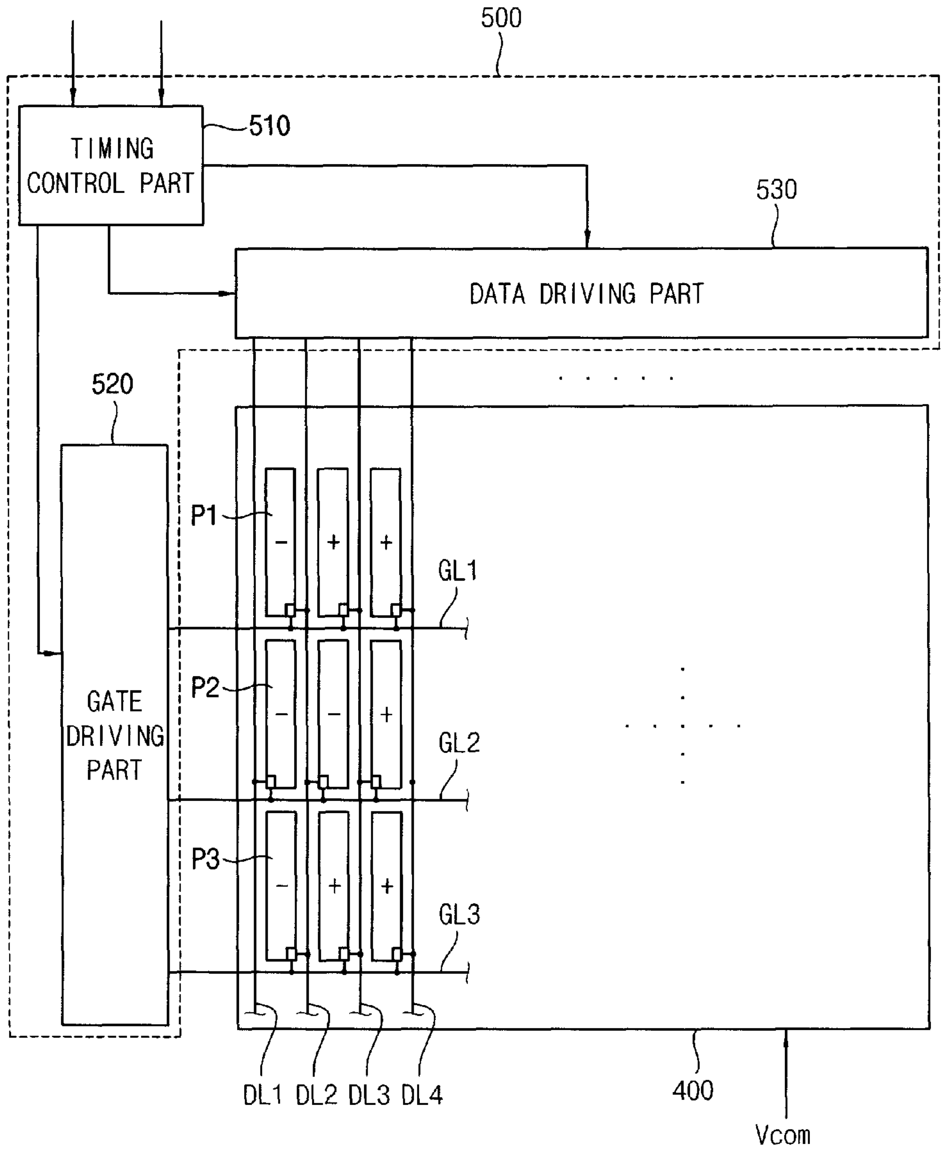
FIG. 3 is a plan view illustrating another exemplary embodiment of a display device according to the present invention.
Figure 4:
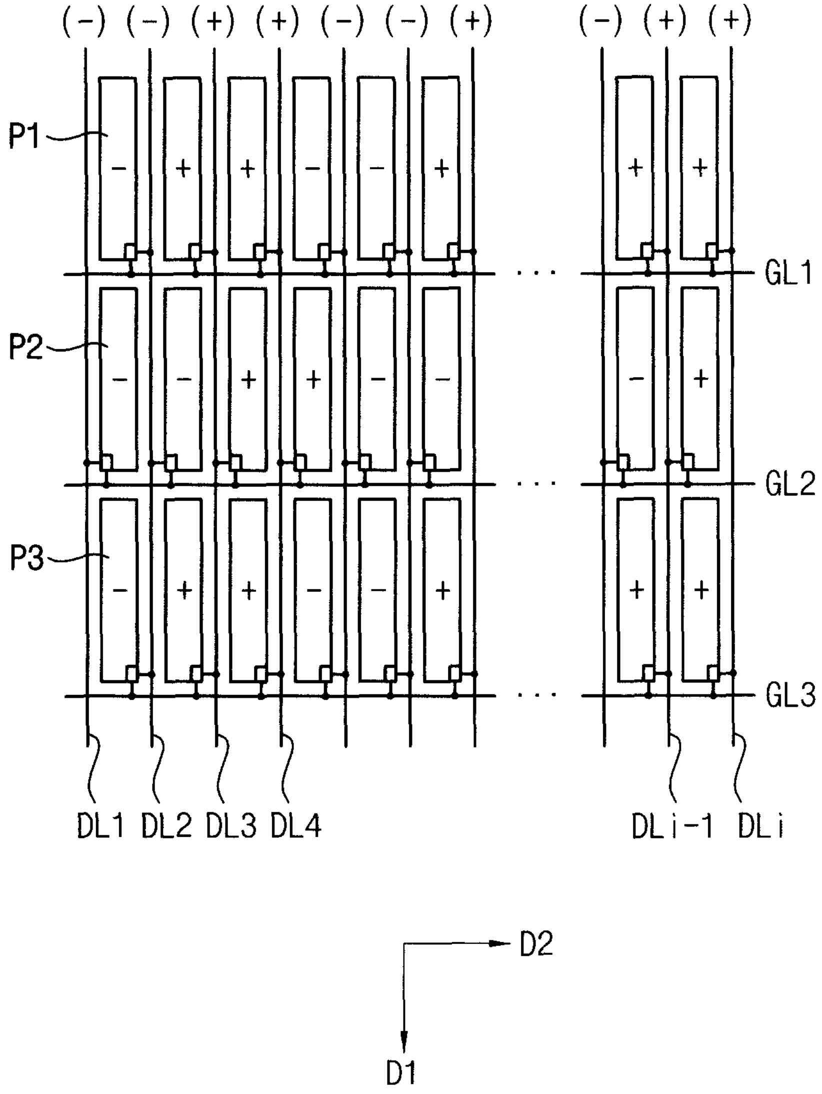
FIG. 4 is a schematic diagram explaining an inversion driving of an exemplary embodiment of a display panel of FIG. 3.

FIG. 3 is a plan view illustrating another exemplary embodiment of a display device according to the present invention. FIG. 4 is a schematic diagram explaining an inversion driving of an exemplary display panel of FIG. 3.

Referring to FIGS. 3 and 4, the display device includes a display panel 400 and a panel driving part 500 which drives the display panel 400. The panel driving part 500 includes a timing control part 510, a data driving part 530 and a gate driving part 520. The panel driving part 500 drives the display panel 400 in a frame frequency of more than about 120 Hz (for example, about 120 Hz or about 240 Hz).

The display panel 400 includes an array substrate, an opposite substrate and a liquid crystal layer interposed between the array substrate and the opposite substrate. The display panel 400 includes a plurality of pixels P1, P2, P3, . . . , etc. The array substrate includes a plurality of data lines DL1, DL2, DL3, DL4, . . . , DLi−1 and DLi, and a plurality of gate lines GL1, GL2, GL3, . . . . The array substrate further includes a switching element connected to a data line and a gate line, and a pixel electrode connected to the switching element. The pixel electrode is formed on a pixel area of the array substrate in which each pixel is provided. The opposite substrate includes a common electrode opposite to the pixel electrodes of the pixels. A common voltage Vcom that is a reference voltage is applied to the common electrode. The common voltage may be a DC voltage having a uniform level.

The data lines DL1, DL2, DL3, DL4, . . . , DLi−1 and DLi are extended in a first direction D1, and are arranged in a second direction D2 crossing the first direction D1. The data lines DL1, DL2, DL3, DL4, . . . , DLi−1 and DLi are connected to a plurality of output terminals of the data driving part 530. Each of the data lines is connected to pixels of a pixel column arranged in the first direction D1 in a zigzag shape. The gate lines GL1, GL2, GL3, . . . are extended in the second direction D2, and are arranged in the first direction D1.

The timing control part 510 controls the data driving part 530 and the gate driving part 520. The timing control part 510 provides the data driving part 530 with a data signal per a unit of a horizontal period (1H) in correspondence with a pixel structure of the display panel 400. Each pixel has a 1G1D (one gate one data) structure in which one gate line and one data line are connected to one pixel.

The data driving part 530 converts data signal provided from the timing control part 510 into a data voltage of an analog type, and outputs the data voltage of the analog type to the data lines DL1, DL2, DL3, DL4, . . . , DLi−1 and DLi. The data driving part 530 outputs data voltages corresponding to an odd numbered pixel column to the remaining data lines except a first data line DL1, that is, a second data line DL2 to the last data line DLi in an even numbered horizontal period through a two-dot inversion method. Moreover, the data driving part 530 outputs data voltages corresponding to an even numbered pixel column to the remaining data lines except the last data line DLi, that is, the first data line DL1 to an (i−1)-th data line DLi−1 in an odd numbered horizontal period through a two-dot inversion method. Moreover, the data driving part 530 inverts a polarity of a data voltage through a 2-dot inversion method that is a shifting by one dot along a left direction per one frame (hereinafter, referred to as "a left side one dot shift inversion method"). For example, data voltages having a polarity sequence such as +, +, −, −, +, +, −, −, . . . , etc., are outputted during an N-th frame, data voltages having a polarity sequence such as +, −, −, +, +, −, −, +, . . . , etc., are outputted during an (N+1)-th frame, and data voltages having a polarity sequence such as −, −, +, +, −, −, +, +, . . . , etc., are outputted during an (N+2)-th frame. Thus, as the left side one dot shift inversion method is employed, display defects such as a greenish phenomenon, vertical-line defects, etc., due to a coupling between a data line and a pixel (or a pixel electrode) may be prevented.

The gate driving part 520 generates a plurality of gate signals in accordance with a control of the timing control part 510 to sequentially provide the gate lines GL1, GL2, GL3, . . . , etc., with the gate signals.

Figure 5:
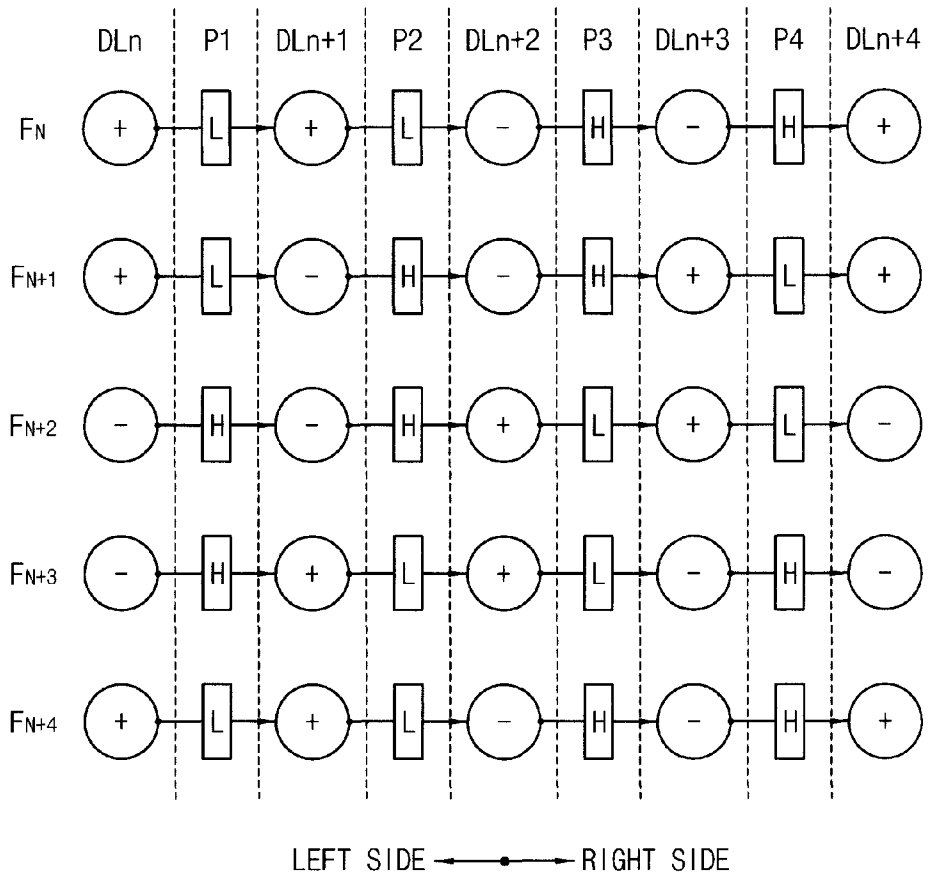
FIG. 5 is a schematic diagram explaining an exemplary method of driving a display panel of FIG. 4.

FIG. 5 is a schematic diagram explaining an exemplary embodiment of a method of driving an exemplary display panel of FIG. 4.

Referring to FIGS. 3, 4 and 5, the data driving part 530 applies data voltages of polarities such as +, +, −, −, + to the data lines DLn, DLn+1, DLn+2, DLn+3 and DLn+4, respectively, (where 'n' is a natural number) during an N-th frame $F_N$, and applies data voltages of polarities such as +, −, −, +, + to the data lines DLn, DLn+1, DLn+2, DLn+3, DLn+4, respectively, during an (N+1)-th frame $F_{N+1}$ in accordance with a one-frame left side shift inversion method. Moreover, the data driving part 530 applies data voltages of polarities such as −, +, +, −, − to the data lines DLn, DLn+1, DLn+2, DLn+3 and DLn+4, respectively, during an (N+3)-th frame $F_{N+3}$, and applies data voltages of polarities such as +, +, −, −, + to the data lines DLn, DLn+1, DLn+2, DLn+3 and DLn+4, respectively, during an (N+4)-th frame $F_{N+4}$ in accordance with the one-frame left side shift inversion method.

When a data voltage applied to the data line falls or rises, a voltage applied to a pixel electrode of the pixel is varied due to a coupling between pixel electrodes of the pixel adjacent to the data line.

As shown in FIG. 5, the first pixel P1 is electrically connected to an n-th data line DLn positioned at a first side thereof, and is adjacent to an (n+1)-th data line DLn+1 positioned at a second side opposite to the first side. A voltage of a first polarity (+) is applied to the n-th and (n+1)-th data lines DLn and DLn+1 during an N-th frame $F_N$, a voltage of the first polarity (+) is applied to the n-th data line DLn during an (N+1)-th frame $F_{N+1}$, and a voltage of the second polarity (−) is applied to an (n+1)-th data line DLn+1 during the (N+1)-th frame $F_{N+1}$. Thus, a polarity variation of the n-th data line DLn is not varied; however, a polarity of the (n+1)-th data line DLn+1 is varied from the first polarity (+) to the second polarity (−) from the N-th frame $F_N$ to the (N+1)-th frame $F_{N+1}$. Therefore, a voltage of the first polarity (+), which is charged to the first pixel P1 due to a coupling between the (n+1)-th data line DLn+1 and the first pixel P1 during a vertical blank interval between the N-th frame $F_N$ and the (N+1)-th frame $F_{N+1}$, is shifted to a low level side (e.g., a low direction 'L').

The second pixel P2 is electrically connected to an (n+1)-th data line DLn+1 positioned at a first side thereof, and is adjacent to an (n+2)-th data line DLn+2 positioned at a second side opposite to the first side. During the N-th frame $F_N$, a voltage of a first polarity (+) is applied to the (n+1)-th data line DLn+1, and a voltage of the second polarity (−) is applied to the (n+2)-th data line DLn+2. Moreover, during the (N+1)-th frame $F_{N+1}$, a voltage of the second polarity (−) is applied to the (n+1)-th data line DLn+1, and a voltage of the second polarity (−) is applied to the (n+2)-th data line DLn+2. Thus, a polarity variation of the (n+2)-th data line DLn+2 is not varied; however, a polarity of the (n+1)-th data line DLn+1 is varied from the first polarity (+) to the second polarity (−) from the N-th frame $F_N$ to the (N+1)-th frame $F_{N+1}$. Therefore, a voltage of the second pixel P2, which is charged due to a coupling between the (n+1)-th data line DLn+1 and the second pixel P2 during a vertical blank interval between the N-th frame $F_N$ and the (N+1)-th frame $F_{N+1}$, is shifted in the low direction 'L'. In the present exemplary embodiment, the description such that a voltage of the second pixel P2 is shifted in the low direction 'L' means that a voltage of the second pixel P2 in a subsequent frame is shifted to have a lower voltage than that of the second pixel P2 in a previous frame.

The third pixel P3 is electrically connected to an (n+2)-th data line DLn+2 positioned at a first side thereof, and is adjacent to an (n+3)-th data line DLn+3 positioned at a second side opposite to the first side. During the N-th frame $F_N$, a voltage of a second polarity (−) is applied to the (n+2)-th data line DLn+2, and a voltage of the second polarity (−) is applied to the (n+3)-th data line DLn+3. Moreover, during the (N+1)-th frame $F_{N+1}$, a voltage of the second polarity (−) is applied to the (n+2)-th data line DLn+2, and a voltage of the first polarity (+) is applied to the (n+3)-th data line DLn+3. Thus, a polarity variation of the (n+2)-th data line DLn+2 is not varied; however, a polarity of the (n+3)-th data line DLn+3 is varied from the second polarity (−) to the first polarity (+). Therefore, a voltage of the third pixel P3, which is charged due to a coupling between the (n+3)-th data line DLn+3 and the third pixel P3 during a vertical blank interval between the N-th frame $F_N$ and the (N+1)-th frame $F_{N+1}$, is shifted to a high level side (e.g., a high direction 'H').

The fourth pixel P4 is electrically connected to an (n+3)-th data line DLn+3 positioned at a first side thereof, and is adjacent to an (n+4)-th data line DLn+4 positioned at a second side opposite to the first side. During the N-th frame $F_N$, a voltage of a second polarity (−) is applied to the (n+3)-th data line DLn+3, and a voltage of the first polarity (+) is applied to the (n+4)-th data line DLn+4. Moreover, during the (N+1)-th frame $F_{N+1}$, a voltage of the first polarity (+) is applied to the (n+3)-th data line DLn+3, and a voltage of the first polarity (+) is applied to the (n+4)-th data line DLn+4. Thus, a polarity variation of the (n+4)-th data line DLn+4 is not varied; however, a polarity of the (n+3)-th data line DLn+3 is varied from the second polarity (−) to the first polarity (+). Therefore, a voltage of the fourth pixel P4, which is charged due to a coupling between the (n+3)-th data line DLn+3 and a common electrode (not shown) during a vertical blank interval between the N-th frame $F_N$ and the (N+1)-th frame $F_{N+1}$, is shifted in the high direction 'H'. In the present exemplary embodiment, the description such that a voltage of the fourth pixel P4 is shifted in the high direction 'H' means that a voltage of the fourth pixel P4 in a subsequent frame is shifted to have a higher voltage than that of the fourth pixel P4 in a previous frame.

During a vertical blank interval between the N-th frame $F_N$ and the (N+1)-th frame $F_{N+1}$, voltages of the first and second pixels P1 and P2 are shifted in the low direction 'L', and voltages of the third and fourth pixels P3 and P4 are shifted in the high direction 'H'.

According to the above method, during a vertical blank interval between the (N+1)-th frame $F_{N+1}$ and the (N+2)-th frame $F_{N+2}$, voltages of the first and fourth pixels P1 and P4 are shifted in the low direction 'L', and voltages of the second and third pixels P2 and P3 are shifted in the high direction 'H'. During a vertical blank interval between the (N+2)-th frame $F_{N+2}$ and the (N+3)-th frame $F_{N+3}$, voltages of the first and second pixels P1 and P2 are shifted in the high direction 'H', and voltages of the third and fourth pixels P3 and P4 are shifted in the low direction 'L'. During a vertical blank interval between the (N+3)-th frame $F_{N+3}$ and the (N+4)-th frame $F_{N+4}$, voltages of the first and fourth pixels P1 and P4 are shifted in the high direction 'H', and voltages of the second and third pixels P2 and P3 are shifted in the low direction 'L'.

As a result, the number of pixels in which a voltage applied to a pixel electrode during a vertical blank interval is shifted along a low direction 'L' is substantially equal to the number of pixels in which a voltage applied to a pixel electrode during a vertical blank interval is shifted along a high direction 'H'. Thus, display defects such as a greenish phenomenon, vertical-line defects, etc., generated due to a voltage variation of a data line may be prevented.

Moreover, when a vertical stripe pattern, for example, a sub-strip pattern displaying a black and a color in one pixel column unit and a strip pattern displaying a black and a color in a plurality of pixel columns corresponding to a unit pixel (e.g., R, G and B), etc., are displayed thereon, a voltage variation of pixels displaying a color is uniform so that display defects are not viewed.

Figure 6A:
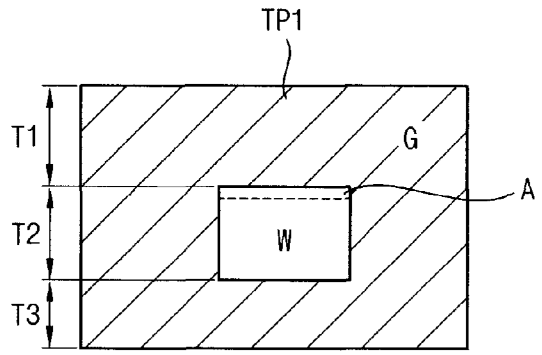
FIGS. 6A, 6B and 6C are schematic diagrams explaining a voltage variation of pixels when a first test pattern is displayed in accordance with an exemplary driving method of the display panel of FIG. 5.
Figure 6B:
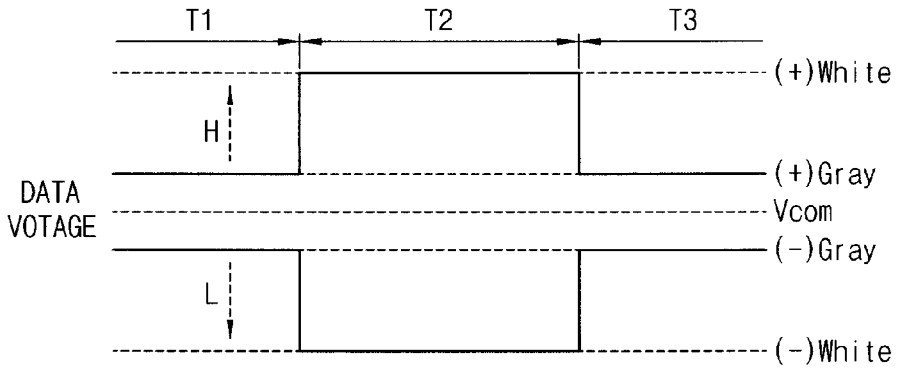
Figure 6C:
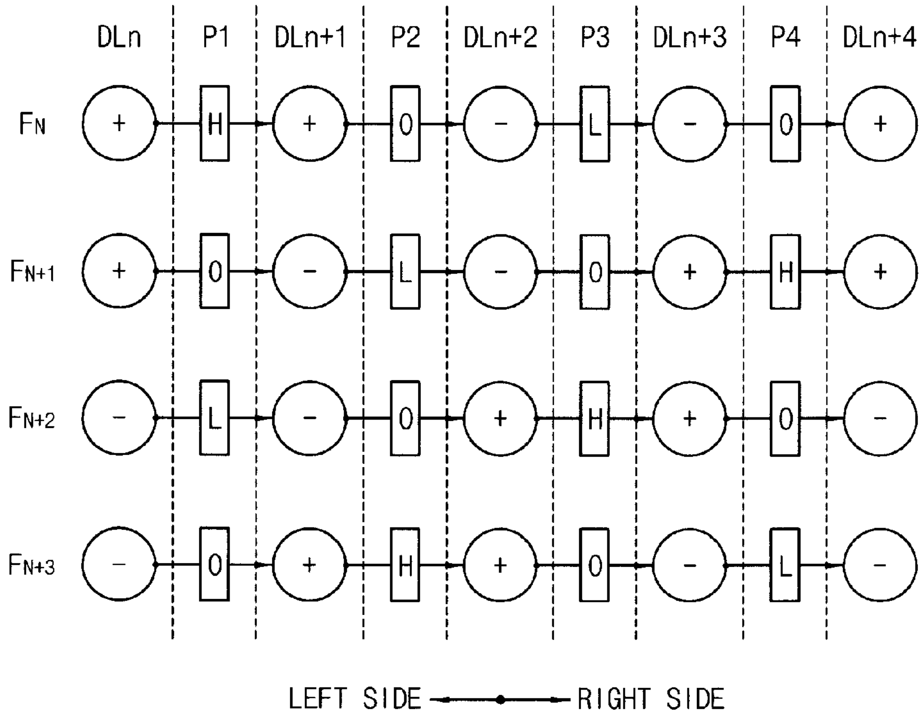

FIGS. 6A, 6B and 6C are schematic diagrams explaining a voltage variation of pixels when a first test pattern is displayed in accordance with an exemplary driving method of the exemplary display panel of FIG. 5.

Referring to FIGS. 6A, 6B and 6C, the display panel 400 displays a first test pattern TP1 in accordance with a one-frame left side shift inversion method. The first test pattern TP1 includes a white box pattern 'W' displayed on a grey background screen 'G'. In this case, a luminance distribution in accordance with voltage variations of first, second, third and fourth pixels P1, P2, P3 and P4 positioned at a boundary portion 'A' of the grey background screen 'G' of pixels displaying the white box pattern 'W' will be described.

A luminance distribution according to a voltage variation of the first, second, third and fourth pixels P1, P2, P3 and P4 during an N-th frame $F_N$ will be described as follows.

The first pixel P1 is electrically connected to an n-th data line DLn positioned at a first side thereof, and is adjacent to an (n+1)-th data line DLn+1 positioned at a second side opposite to the first side. A gray voltage (+Gray) of a first polarity (+) is applied to the n-th and (n+1)-th data lines DLn and DLn+1 during a first interval T1, and a white voltage (+White) of the first polarity (+) is applied to the n-th and (n+1)-th data lines DLn and DLn+1 during a second interval T2. Thus, in the first pixel P1 positioned at the boundary portion 'A', a voltage applied to the n-th data line DLn is varied from a gray voltage (+Gray) of a first polarity (+) to a white voltage (+White), so that a voltage of the first pixel P1, which is applied to a pixel electrode, is shifted in a high direction 'H'. Moreover, in the first pixel P1, a voltage applied to the (n+1)-th data line DLn+1 is also varied from a gray voltage (+Gray) of a first polarity (+) to a white voltage (+White) of a first polarity (+), so that a voltage applied to a pixel electrode of the first pixel P1 is shifted in a high direction 'H'. Thus, a voltage of the first pixel P1 is shifted in a high direction 'H' due to a voltage variation of the n-th and (n+1)-th data lines DLn and DLn+1, so that the first pixel P1 has a luminance brighter than a target luminance.

The second pixel P2 is electrically connected to an (n+1)-th data line DLn+1 positioned at a first side thereof, and is adjacent to an (n+2)-th data line DLn+2 positioned at a second side opposite to the first side. A gray voltage (+Gray) of a first polarity (+) is applied to the (n+1)-th data line DLn+1 during a first interval T1, and a white voltage (+White) of the first polarity (+) is applied to the (n+1)-th data line DLn+1 during a second interval T2. A gray voltage (−Gray) of a second polarity (−) is applied to the (n+2)-th data line DLn+2 during a first interval T1, and a white voltage (−White) of the second polarity (−) is applied to the (n+2)-th data line DLn+2 during a second interval T2. Thus, a voltage of the second pixel P2 positioned at the boundary portion 'A' is shifted in a high direction 'H' due to a voltage of the (n+1)-th data line DLn+1, which varies from a gray voltage (+Gray) of a first polarity (+) to a white voltage (+White) of a first polarity (+). However, a voltage of the second pixel P2 is shifted in a low direction 'L' due to a voltage of the (n+2)-th data line DLn+2, which varies from a gray voltage (−Gray) of a second polarity (−) to a white voltage (−White) of a second polarity (−). As a result, a variation component is offset due to the (n+1)-th and (n+2)-th data lines DLn+1 and DLn+2 having opposite voltage variations to each other, so that the second pixel P2 has a target luminance.

The third pixel P3 is electrically connected to an (n+2)-th data line DLn+2 positioned at a first side thereof, and is adjacent to an (n+3)-th data line DLn+3 positioned at a second side opposite to the first side. A gray voltage (−Gray) of a second polarity (−) is applied to the (n+2)-th and (n+3)-th data lines DLn+2 and DLn+3 during a first interval T1, and a white voltage (−White) of the second polarity (−) is applied to the (n+2)-th and (n+3)-th data line DLn+2 and DLn+3 during a second interval T2. Thus, a voltage of the third pixel P3 positioned at the boundary portion 'A' is shifted in a low direction 'L' due to a voltage of the (n+2)-th and (n+3)-th data lines DLn+2 and DLn+3, which varies from a gray voltage (−Gray) of a second polarity (−) to a white voltage (−White) of a second polarity (−). Therefore, a voltage of the third pixel P3 is shifted in a low direction 'L' due to a voltage of the (n+2)-th and (n+3)-th data lines DLn+2 and DL+3, so that the third pixel P3 has a luminance brighter than a target luminance.

The fourth pixel P4 is electrically connected to an (n+3)-th data line DLn+3 positioned at a first side thereof, and is adjacent to an (n+4)-th data line DLn+4 positioned at a second side opposite to the first side. A gray voltage (−Gray) of a second polarity (−) is applied to the (n+3)-th data line DLn+3 during a first interval T1, and a white voltage (−White) of the second polarity (−) is applied to the (n+3)-th data line DLn+3 during a second interval T2. A gray voltage (+Gray) of a first polarity (+) is applied to the (n+4)-th data line DLn+4 during a first interval T1, and a white voltage (+White) of the first polarity (+) is applied to the (n+4)-th data line DLn+4 during a second interval T2. Thus, a voltage of the fourth pixel P4 positioned at the boundary portion 'A' is shifted in a low direction 'L' due to a voltage of the (n+3)-th data line DLn+3, which varies from a gray voltage (−Gray) of a second polarity (−) to a white voltage (−White) of a second polarity (−). However, a voltage of the fourth pixel P4 is shifted in a high direction 'H' due to a voltage of the (n+4)-th data line DLn+4, which varies from a gray voltage (+Gray) of a first polarity (+) to a white voltage (+White) of a first polarity (+). As a result, a variation component is offset due to the (n+3)-th and (n+4)-th data lines DLn+3 and DLn+4 having opposite voltage variations to each other, so that the fourth pixel P4 has a target luminance.

Since a voltage of the first pixel P1 is shifted in a high direction 'H' at a first polarity (+) and a voltage of the third pixel P3 is shifted in a low direction 'L' at a second polarity (−) during an N-th frame $F_N$, the first and third pixels P1 and P3 become brighter. Since voltages of the second and fourth pixels P2 and P4 are not shifted, luminance of the second and fourth pixels P2 and P4 is not varied during the N-th frame $F_N$.

According to the above method, since a voltage of the second pixel P2 is shifted in a low direction 'L' at a second polarity (−) and a voltage of the fourth pixel P4 is shifted in a high direction 'H' at a first polarity (+) during an (N+1)-th frame $F_{N+1}$, the second and fourth pixels P2 and P4 become brighter. Since voltages of the first and third pixels P1 and P3 are not shifted, luminance of the first and third pixels P1 and P3 is not varied during the (N+1)-th frame $F_{N+1}$.

Since a voltage of the first pixel P1 is shifted in a low direction 'L' at a second polarity (−) and a voltage of the third pixel P3 is shifted in a high direction 'H' at a first polarity (+) during an (N+2)-th frame $F_{N+2}$, the first and third pixels P1 and P3 become brighter. Since voltages of the second and fourth pixels P2 and P4 are not shifted, luminance of the second and fourth pixels P2 and P4 is not varied during the (N+2)-th frame $F_{N+2}$. Since a voltage of the second pixel P2 is shifted in a high direction 'H' at a first polarity (+) and a voltage of the fourth pixel P4 is shifted in a low direction 'L' at a second polarity (−) during an (N+3)-th frame $F_{N+3}$, the second and fourth pixels P2 and P4 are brighter. Since voltages of the first and third pixels P1 and P3 are not shifted, luminance of the first and third pixels P1 and P3 is not varied during the (N+3)-th frame $F_{N+3}$.

As described above, pixels of the test pattern displaying a boundary portion 'A' of a high gradation, which is varied from a low gradation to a high gradation, become brighter in a uniform manner. Accordingly, display defects such as a crosstalk, etc., generated due to a voltage variation of a data line at the boundary portion 'A' may be prevented.

Figure 7A:
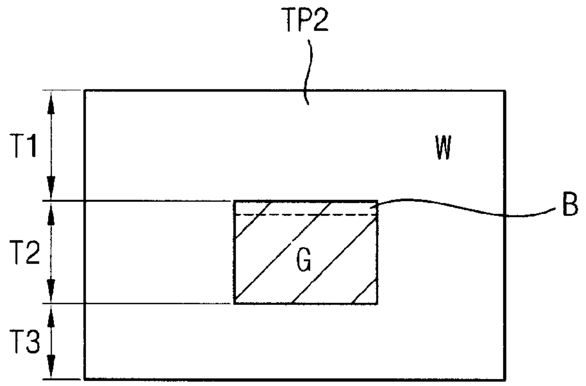
FIGS. 7A, 7B and 7C are schematic diagrams explaining a voltage variation of pixels when a second test pattern is displayed in accordance with an exemplary driving method of the display panel of FIG. 5.
Figure 7B:
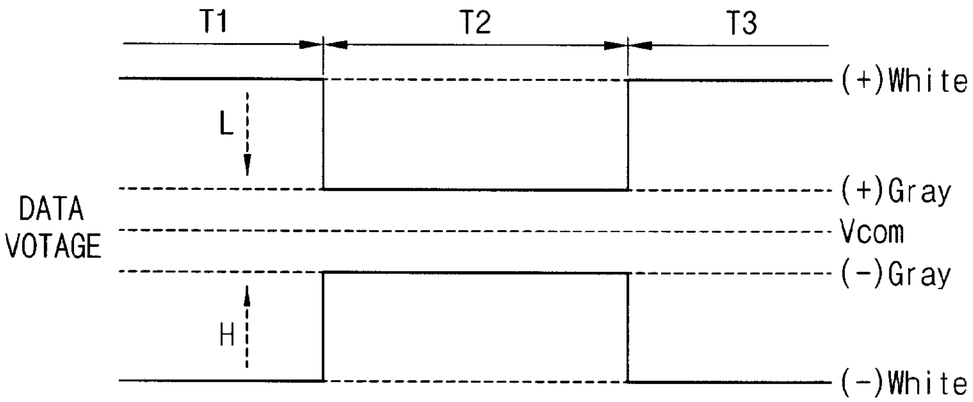
Figure 7C:
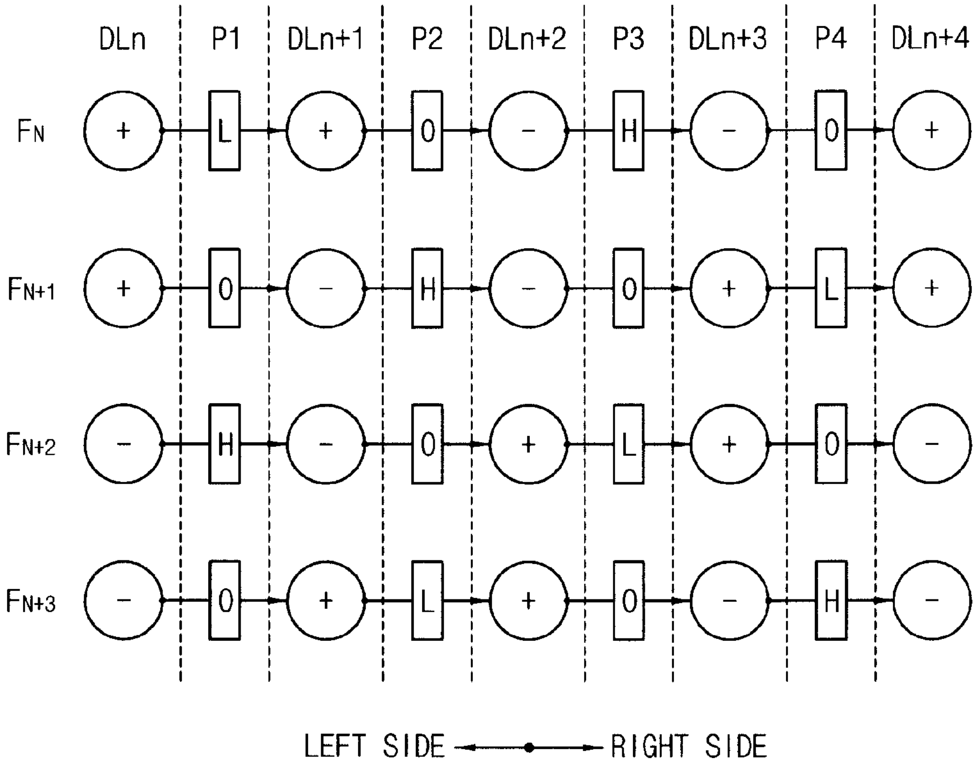

FIGS. 7A, 7B and 7C are schematic diagrams explaining a voltage variation of pixels when a second test pattern is displayed in accordance with an exemplary embodiment of a driving method of the exemplary display panel of FIG. 5.

Referring to FIGS. 7A, 7B and 7C, the display panel 400 displays a second test pattern TP2 in accordance with a one-frame left side shift inversion method. The second test pattern TP2 includes a grey box pattern 'G' displayed on a white background screen 'W'. In this case, a luminance distribution in accordance with voltage variations of first, second, third and fourth pixels P1, P2, P3 and P4 positioned at a boundary portion 'B' of the white background screen 'W' of pixels displaying the grey box pattern 'G' will be described.

A luminance distribution according to a voltage variation of the first, second, third and fourth pixels P1, P2, P3 and P4 during an N-th frame $F_N$ will be described as follows.

The first pixel P1 is electrically connected to an n-th data line DLn positioned at a first side thereof, and is adjacent to an (n+1)-th data line DLn+1 positioned at a second side opposite to the first side. A white voltage (+White) of a first polarity (+) is applied to the n-th and (n+1)-th data lines DLn and DLn+1 during a first interval T1, and a gray voltage (+Gray) of the first polarity (+) is applied to the n-th and (n+1)-th data lines DLn and DLn+1 during a second interval T2. Thus, in the first pixel P1 positioned at the boundary portion 'B', a voltage applied to the n-th and (n+1)-th data lines DLn and DLn+1 is varied from a white voltage (+White) of a first polarity (+) to a gray voltage (+Gray) of the first polarity (+), so that a voltage of the first pixel P1 is shifted in a low direction 'L'.

Thus, a voltage of the first pixel P1 is shifted in a low direction 'L' due to a voltage variation of the n-th and (n+1)-th data lines DLn and DLn+1, so that the first pixel P1 has a luminance darker than a target luminance.

The second pixel P2 is electrically connected to an (n+1)-th data line DLn+1 positioned at a first side thereof, and is adjacent to an (n+2)-th data line DLn+2 positioned at a second side opposite to the first side. A white voltage (+White) of a first polarity (+) is applied to the (n+1)-th data line DLn+1 during a first interval T1, and a gray voltage (+Gray) of the first polarity (+) is applied to the (n+1)-th data line DLn+1 during a second interval T2. A white voltage (−White) of a second polarity (−) is applied to the (n+2)-th data line DLn+2 during a first interval T1, and a gray voltage (−Gray) of the second polarity (−) is applied to the (n+2)-th data line DLn+2 during a second interval T2. Thus, a voltage of the second pixel P2 positioned at the boundary portion 'B' is shifted in a low direction 'L' due to a voltage of the (n+1)-th data line DLn+1, which varies from a white voltage (+White) of a first polarity (+) to a gray voltage (+Gray) of a first polarity (+). However, a voltage of the second pixel P2 is shifted in a high direction 'H' due to a voltage of the (n+2)-th data line DLn+2, which varies from a white voltage (−White) of a second polarity (−) to a gray voltage (−Gray) of a second polarity (−). As a result, a variation component is offset due to the (n+1)-th and (n+2)-th data lines DLn+1 and DLn+2 having opposite voltage variations to each other, so that the second pixel P2 has a target luminance.

The third pixel P3 is electrically connected to an (n+2)-th data line DLn+2 positioned at a first side thereof, and is adjacent to an (n+3)-th data line DLn+3 positioned at a second side opposite to the first side. A white voltage (−White) of a second polarity (−) is applied to the (n+2)-th and (n+3)-th data lines DLn+2 and DLn+3 during a first interval T1, and a gray voltage (−Gray) of the second polarity (−) is applied to the (n+2)-th and (n+3)-th data lines DLn+2 and DLn+3 during a second interval T2. Thus, a voltage of the third pixel P3 positioned at the boundary portion 'B' is shifted in a high direction 'H' due to a voltage variation of the (n+2)-th and (n+3)-th data lines DLn+2 and DLn+3. Therefore, a voltage of the third pixel P3 is shifted in a high direction 'H' due to a voltage variation of the (n+2)-th and (n+3)-th data lines DLn+2 and DL+3, so that the third pixel P3 has a luminance darker than a target luminance.

The fourth pixel P4 is electrically connected to an (n+3)-th data line DLn+3 positioned at a first side thereof, and is adjacent to an (n+4)-th data line DLn+4 positioned at a second side opposite to the first side. A white voltage (−White) of a second polarity (−) is applied to the (n+3)-th data line DLn+3 during a first interval T1, and a gray voltage (−Gray) of the second polarity (−) is applied to the (n+3)-th data line DLn+3 during a second interval T2. A white voltage (+White) of a first polarity (+) is applied to the (n+4)-th data line DLn+4 during a first interval T1, and a gray voltage (+Gray) of the first polarity (+) is applied to the (n+4)-th data line DLn+4 during a second interval T2. Thus, a variation component is offset due to the (n+3)-th and (n+4)-th data lines DLn+3 and DLn+4 having opposite voltage variations to each other, so that the fourth pixel P4 positioned at the boundary portion 'B' has a target luminance.

Since a voltage of the first pixel P1 is shifted in a low direction 'L' at a first polarity (+) and a voltage of the third pixel P3 is shifted in a high direction 'H' at a second polarity (−) during an N-th frame $F_N$, luminance of the first and third pixels P1 and P3 becomes darker. Since voltages of the second and fourth pixels P2 and P4 are not shifted, luminance of the second and fourth pixels P2 and P4 is not varied during the N-th frame $F_N$.

According to the above method, since a voltage of the second pixel P2 is shifted in a high direction 'H' at a second polarity (−) and a voltage of the fourth pixel P4 is shifted in a low direction 'L' at a first polarity (+) during an (N+1)-th frame $F_{N+1}$, luminance of the second and fourth pixels P2 and P4 becomes darker. Since voltages of the first and third pixels P1 and P3 are not shifted, luminance of the first and third pixels P1 and P3 is not varied during the (N+1)-th frame $F_{N+1}$. Since a voltage of the first pixel P1 is shifted in a high direction 'H' at a second polarity (−) and a voltage of the third pixel P3 is shifted in a low direction 'L' at a first polarity (+) during an (N+2)-th frame $F_{N+2}$, luminance of the first and third pixels P1 and P3 becomes darker. Since voltages of the second and fourth pixels P2 and P4 are not shifted, luminance of the second and fourth pixels P2 and P4 is not varied during the (N+2)-th frame $F_{N+2}$. Since a voltage of the second pixel P2 is shifted in a low direction 'L' at a first polarity (+) and a voltage of the fourth pixel P4 is shifted in a high direction 'H' at a second polarity (−) during an (N+3)-th frame $F_{N+3}$, luminance of the second and fourth pixels P2 and P4 becomes brighter. Since voltages of the first and third pixels P1 and P3 are not shifted, luminance of the first and third pixels P1 and P3 is not varied during the (N+3)-th frame $F_{N+3}$.

As described above, pixels of the test pattern displaying a boundary portion 'B' of a low gradation, which is varied from a high gradation to a low gradation, become darker in a uniform manner. Thus, display defects such as a crosstalk, etc., generated due to a voltage variation of a data line at the boundary portion 'B' may be prevented.

Figure 8:
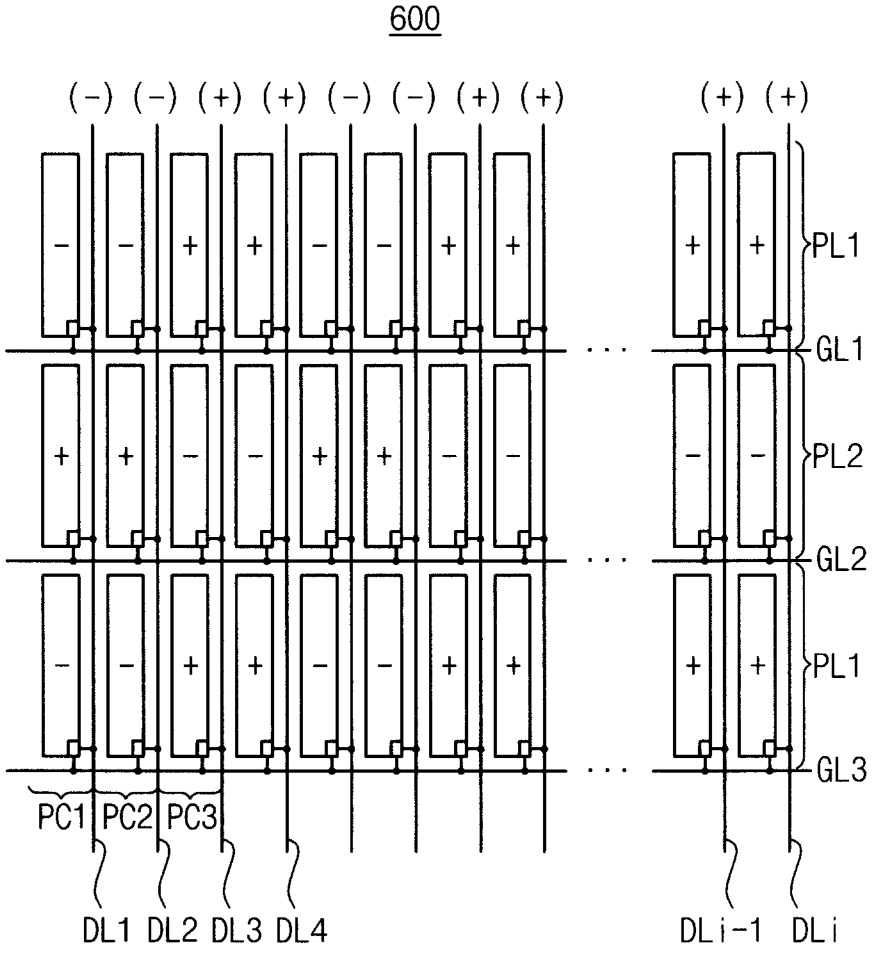
FIG. 8 is a plan view illustrating still another exemplary embodiment of a display device according to the present invention.

FIG. 8 is a plan view illustrating still another exemplary embodiment of a display device according to the present invention.

Referring to FIGS. 3 and 8, the display device according to the present exemplary embodiment is substantially the same as the display device of FIG. 3 except for a display panel 600.

The display panel 600 includes a plurality of data lines DL1, DL2, DL3, . . . , DLi−1 and DLi, a plurality of gate lines GL1, GL2, GL3, . . . crossing the data lines DL1, DL2, DL3, . . . , DLi−1 and DLi, and a plurality of pixels.

Pixels of a first column PC1 are electrically connected to a first data line DL1, and pixels of a second pixel column PC2 are electrically connected to a second data line DL2. Thus, pixels of pixel columns are electrically connected to data lines positioned at a first side thereof.

Pixels of a first pixel row PL1 are electrically connected to the data lines DL1, DL2, DL3, . . . , DLi−1 and DLi, respectively, and a first gate line GL1. Pixels of a second pixel row PL2 are electrically connected to the data lines DL1, DL2, DL3, . . . , DLi−1 and DLi, respectively, and a second gate line GL2. Pixels of a third pixel row PL3 are electrically connected to the data lines DL1, DL2, DL3, . . . , DLi−1 and DLi, respectively, and a third gate line GL3. Thus, each pixel has a 1G1D structure in which one gate line and one data line are connected to each other.

The display panel 600 may be driven using a column inversion method during one frame.

An exemplary embodiment of a driving method of the display panel 600 according to the present invention is substantially the same as the exemplary driving method explained referring to FIG. 5, and thus any repetitive detailed description thereof will hereinafter be omitted. Exemplary embodiments of display panels explained as follows may be adapted to the display panel 400 of FIG. 4 and the display panel 600 of FIG. 8. Hereinafter, each exemplary embodiment of a driving method of a display panel will be explained by using the display panel 400 of FIG. 4.

Figure 9:
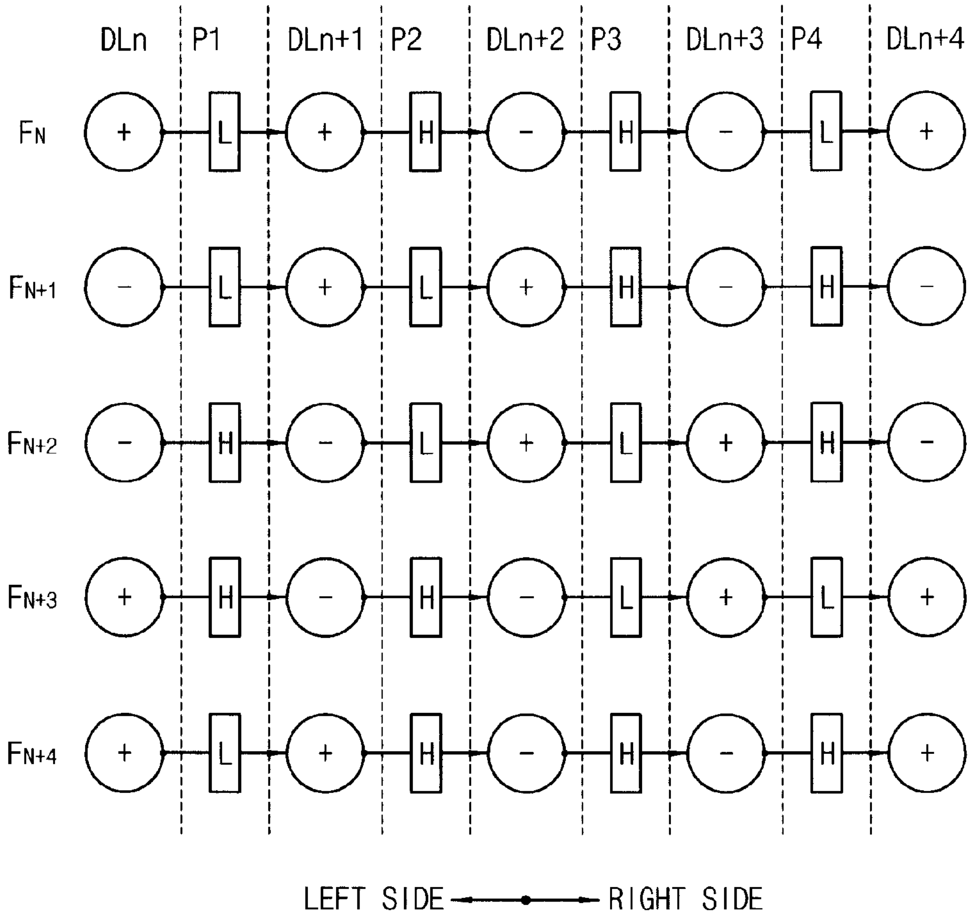
FIG. 9 is a schematic diagram explaining still another exemplary embodiment of a method of driving an exemplary display panel according to the present invention.

FIG. 9 is a schematic diagram explaining still another exemplary embodiment of a method of driving a display panel according to the present invention.

Referring to FIGS. 3, 4 and 9, the exemplary embodiment of the data driving part 530 provides data lines with voltages in accordance with a one-frame right side shift inversion method. That is, the data driving part 530 applies data voltages of polarities such as +, +, −, −, + to the data lines DLn, DLn+1, DLn+2, DLn+3 and DLn+4, respectively, (where 'n' is a natural number) during an N-th frame $F_N$, and applies data voltages of polarities such as −, +, +, −, − to the data lines DLn, DLn+1, DLn+2, DLn+3, DLn+4, respectively, during an (N+1)-th frame $F_{N+1}$ in accordance with the one-frame right side shift inversion method. Moreover, the data driving part 530 applies data voltages of polarities such as −, −, +, +, − to the data lines DLn, DLn+1, DLn+2, DLn+3 and DLn+4, respectively, during an (N+2)-th frame $F_{N+2}$, applies data voltages of polarities such as +, −, −, +, + to the data lines DLn, DLn+1, DLn+2, DLn+3 and DLn+4, respectively, during an (N+3)-th frame $F_{N+3}$, and applies data voltages of polarities such as +, +, −, −, + to the data lines DLn, DLn+1, DLn+2, DLn+3 and DLn+4, respectively, during an (N+4)-th frame $F_{N+4}$ in accordance with the one-frame right side shift inversion method.

As shown in FIG. 9, the first pixel P1 is electrically connected to an n-th data line DLn positioned at a first side thereof, and is adjacent to an (n+1)-th data line DLn+1 positioned at a second side opposite to the first side. A voltage of a first polarity (+) is applied to the n-th and (n+1)-th data lines DLn and DLn+1 during an N-th frame $F_N$, a voltage of the second polarity (−) is applied to the n-th data line DLn during an (N+1)-th frame $F_{N+1}$, and a voltage of the first polarity (+) is applied to an (n+1)-th data line DLn+1 during the (N+1)-th frame $F_{N+1}$. Thus, a polarity of the n-th data line DLn is varied from the first polarity (+) to the second polarity (−), so that voltage of the first pixel P1 is shifted in a low direction 'L'.

The second pixel P2 is electrically connected to an (n+1)-th data line DLn+1 positioned at a first side thereof, and is adjacent to an (n+2)-th data line DLn+2 positioned at a second side opposite to the first side. During the N-th frame $F_N$, a voltage of a first polarity (+) is applied to the (n+1)-th data line DLn+1, and a voltage of the second polarity (−) is applied to the (n+2)-th data line DLn+2. Moreover, during the (N+1)-th frame $F_{N+1}$, a voltage of the first polarity (+) is applied to the (n+1)-th data line DLn+1, and a voltage of the first polarity (+) is applied to the (n+2)-th data line DLn+2. Thus, a polarity of the (n+2)-th data line DLn+2 is varied from the second polarity (−) to the first polarity (+), so that voltage of the second pixel P2 is shifted in a high direction 'H'.

The third pixel P3 is electrically connected to an (n+2)-th data line DLn+2 positioned at a first side thereof, and is adjacent to an (n+3)-th data line DLn+3 positioned at a second side opposite to the first side. During the N-th frame $F_N$, a voltage of a second polarity (−) is applied to the (n+2)-th data line DLn+2, and a voltage of the second polarity (−) is applied to the (n+3)-th data line DLn+3. Moreover, during the (N+1)-th frame $F_{N+1}$, a voltage of the first polarity (+) is applied to the (n+2)-th data line DLn+2, and a voltage of the second polarity (−) is applied to the (n+3)-th data line DLn+3. Thus, a polarity of the (n+3)-th data line DLn+3 is varied from the second polarity (−) to the first polarity (+), so that voltage of the third pixel P3 is shifted in a high direction 'H'.

The fourth pixel P4 is electrically connected to an (n+3)-th data line DLn+3 positioned at a first side thereof, and is adjacent to an (n+4)-th data line DLn+4 positioned at a second side opposite to the first side. During the N-th frame $F_N$, a voltage of a second polarity (−) is applied to the (n+3)-th data line DLn+3, and a voltage of the first polarity (+) is applied to the (n+4)-th data line DLn+4. Moreover, during the (N+1)-th frame $F_{N+1}$, a voltage of the second polarity (−) is applied to the (n+3)-th data line DLn+3, and a voltage of the second polarity (−) is applied to the (n+4)-th data line DLn+4. Thus, a polarity of the (n+4)-th data line DLn+4 is varied from the first polarity (+) to the second polarity (−), so that voltage of the fourth pixel P4 is shifted in a low direction 'L'.

During a vertical blank interval between the N-th frame $F_N$ and the (N+1)-th frame $F_{N+1}$, voltages of the first and fourth pixels P1 and P4 are shifted in the low direction 'L', and voltages of the second and third pixels P2 and P3 are shifted in the high direction 'H'.

According to the above method, during a vertical blank interval between the (N+1)-th frame $F_{N+1}$ and the (N+2)-th frame $F_{N+2}$, voltages of the first and second pixels P1 and P2 are shifted in the low direction 'L', and voltages of the third and fourth pixels P3 and P4 are shifted in the high direction 'H'. During a vertical blank interval between the (N+2)-th frame $F_{N+2}$ and the (N+3)-th frame $F_{N+3}$, voltages of the second and third pixels P2 and P3 are shifted in the low direction 'L', and voltages of the first and fourth pixels P1 and P4 are shifted in the high direction 'H'. During a vertical blank interval between the (N+3)-th frame $F_{N+3}$ and the (N+4)-th frame $F_{N+4}$, voltages of the first and second pixels P1 and P2 are shifted in the high direction 'H', and voltage of the third and fourth pixels P3 and P4 are shifted in the low direction 'L'.

As a result, the number of pixels in which a voltage applied to a pixel electrode during a vertical blank interval is shifted along a low direction 'L' is substantially equal to the number of pixels in which a voltage applied to a pixel electrode during a vertical blank interval is shifted along a high direction 'H'. Thus, display defects such as a greenish phenomenon, vertical-line defects, etc., due to a voltage variation of a data line may be prevented.

Moreover, when a vertical strip pattern is displayed, shift directions of pixels displaying a color are uniform so that display defects are not viewed.

Figure 10:
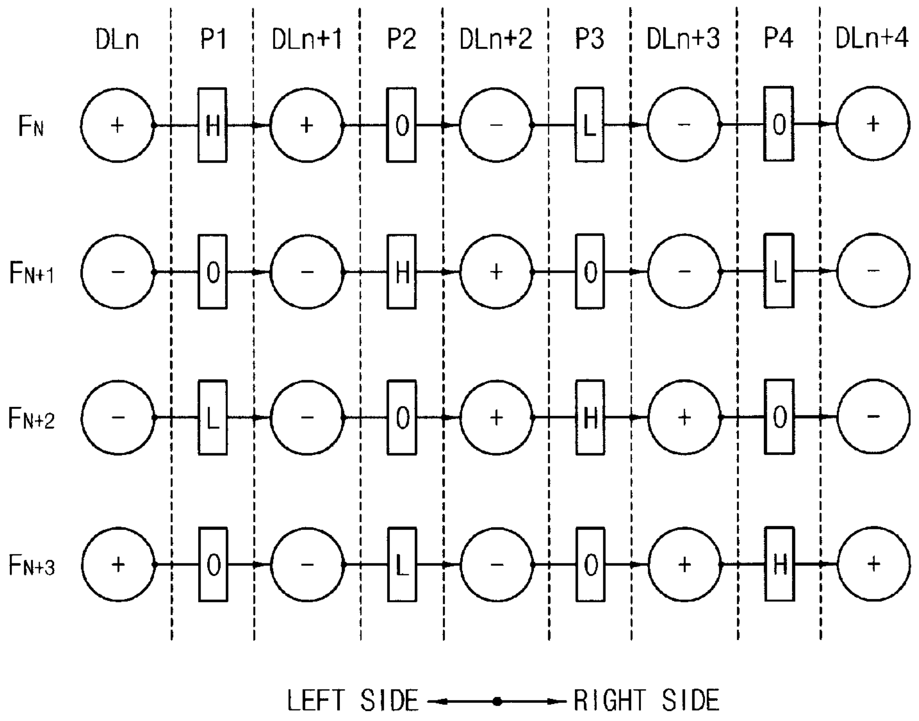
FIG. 10 is a schematic diagram explaining a voltage variation of pixels when a first test pattern is displayed on the display panel of FIG. 9.

FIG. 10 is a schematic diagram explaining a voltage variation of pixels when a first test pattern is displayed on the exemplary display panel of FIG. 9.

Referring to FIGS. 6A, 6B and 10, the display panel 400 displays a first test pattern TP1 including a white box pattern 'W' displayed on a background image 'G' in accordance with a one-frame right side shift inversion method. In this case, a luminance distribution in accordance with voltage variations of first, second, third and fourth pixels P1, P2, P3 and P4 positioned at a boundary portion 'A' of a grey background screen 'G' of pixels displaying the white box pattern 'W' will be described.

A luminance distribution according to a voltage variation of the first, second, third and fourth pixels P1, P2, P3 and P4 during an (N+1)-th frame $F_{N+1}$ will be described as follows.

The first pixel P1 is electrically connected to an n-th data line DLn positioned at a first side thereof, and is adjacent to an (n+1)-th data line DLn+1 positioned at a second side opposite to the first side. A gray voltage (−Gray) of a second polarity (−) is applied to the n-th data lines DLn during a first interval T1, and a white voltage (−White) of a second polarity (−) is applied to the n-th data lines DLn during a second interval T2. A gray voltage (+Gray) of a first polarity (+) is applied to the (n+1)-th data line DLn+1 during a first interval T1, and a white voltage (+White) that is higher than the gray voltage (+Gray) of a first polarity (+) is applied to the (n+1)-th data lines DLn+1 during a second interval T2. Thus, a voltage of the first pixel P1 positioned at the boundary portion 'A' is shifted in a low direction 'L' due to a voltage of the n-th data line DLn varying from a gray voltage (−Gray) of a second polarity (−) to a white voltage (−White) of a second polarity (−). Moreover, a voltage of the first pixel P1 is shifted in a high direction 'H' due to a voltage of the (n+1)-th data line DLn+1 varying from a gray voltage (+Gray) of a first polarity (+) to a white voltage (+White) of a first polarity (+). As a result, a variation component is offset due to the (n+1)-th and (n+2)-th data lines DLn+1 and DLn+2 having opposite voltage variations to each other, so that the first pixel P1 has a target luminance.

The second pixel P2 is electrically connected to an (n+1)-th data line DLn+1 positioned at a first side thereof, and is adjacent to an (n+2)-th data line DLn+2 positioned at a second side opposite to the first side. A gray voltage (+Gray) of a first polarity (+) is applied to the (n+1)-th and (n+2)-th data lines DLn+1 and DLn+2 during a first interval T1, and a white voltage (+White) of the first polarity (+) is applied to the (n+1)-th and (n+2)-th data lines DLn+1 and DLn+2 during a second interval T2. Thus, since a voltage of the (n+1)-th data line DLn+1 is varied from a gray voltage (+Gray) of a first polarity (+) to a white voltage (+White) of a first polarity (+), a voltage of the second pixel P2 positioned at the boundary portion 'A' is shifted in a high direction 'H'. Moreover, since a voltage of the (n+2)-th data line DLn+2 is varied from a gray voltage (+Gray) of a first polarity (+) to a white voltage (+White) of a first polarity (+), a voltage of the second pixel P2 is shifted in a high direction 'H'. Therefore, a voltage of the second pixel P2 is shifted in a high direction 'H' due to a voltage variation of the (n+1)-th and (n+2)-th data lines DLn+1 and DLn+2, so that the second pixel P2 has a luminance brighter than a target luminance.

The third pixel P3 is electrically connected to an (n+2)-th data line DLn+2 positioned at a first side thereof, and is adjacent to an (n+3)-th data line DLn+3 positioned at a second side opposite to the first side. A gray voltage (+Gray) of a first polarity (+) is applied to the (n+2)-th data line DLn+2 during a first interval T1, and a white voltage (+White) of the first polarity (+) is applied to the (n+2)-th data line DLn+2 during a second interval T2. A gray voltage (−Gray) of a second polarity (−) is applied to the (n+3)-th data line DLn+3 during a first interval T1, and a white voltage (−White) of the second polarity (−) is applied to the (n+3)-th data line DLn+3 during a second interval T2. Thus, a voltage of the third pixel P3 positioned at the boundary portion 'A' is shifted in a high direction 'H' due to a voltage of the (n+2)-th data line DLn+2, which varies from a gray voltage (+Gray) of a first polarity (+) to a white voltage (+White) of a first polarity (+). Moreover, a voltage of the third pixel P3 is shifted in a low direction 'L' due to a voltage of the (n+3)-th data line DLn+3, which varies from a gray voltage (−Gray) of a second polarity (−) to a white voltage (−White) of a second polarity (−). As a result, a variation component is offset due to the (n+2)-th and (n+3)-th data lines DLn+2 and DLn+3 having opposite voltage variations to each other, so that the third pixel P3 has a target luminance.

The fourth pixel P4 is electrically connected to an (n+3)-th data line DLn+3 positioned at a first side thereof, and is adjacent to an (n+4)-th data line DLn+4 positioned at a second side opposite to the first side. A gray voltage (−Gray) of a second polarity (−) is applied to the (n+3)-th and (n+4)-th data lines DLn+3 and DLn+4 during a first interval T1, and a white voltage (−White) of the second polarity (−) is applied to the (n+3)-th and (n+4)-th data lines DLn+3 and DLn+4 during a second interval T2. Thus, since voltages applied to the (n+3)-th and (n+4)-th data lines DLn+3 and DLn+4 are varied from a gray voltage (−Gray) of a second polarity (−) to a white voltage (−White) of a second polarity (−), a voltage of the fourth pixel P4 positioned at the boundary portion 'A' is shifted in a low direction 'L'. Therefore, a voltage of the fourth pixel P4 is shifted in a low direction 'L' due to a voltage variation of the (n+3)-th and (n+4)-th data lines DLn+3 and DLn+4, so that the fourth pixel P4 has a luminance brighter than a target luminance.

Since a voltage of the second pixel P2 is shifted in a high direction 'H' at a first polarity (+) and a voltage of the fourth pixel P4 is shifted in a low direction 'L' at a second polarity (−) during an (N+1)-th frame $F_{N+1}$, a luminance of the second and fourth pixels P2 and P4 is increased. Since voltages of the first and third pixels P1 and P3 are not shifted, luminance of the first and third pixels P1 and P3 is not varied during the (N+1)-th frame $F_{N+1}$.

Since a voltage of the first pixel P1 is shifted in a low direction 'L' at a second polarity (−) and a voltage of the third pixel P3 is shifted in a high direction 'H' at a first polarity (+) during an (N+2)-th frame $F_{N+2}$, a luminance of the first and third pixels P1 and P3 is increased. Since voltages of the second and fourth pixels P2 and P4 are not shifted, luminance of the second and fourth pixels P2 and P4 is not varied during the (N+2)-th frame $F_{N+2}$.

According to the one-frame right side shift inversion method, pixels of the test pattern displaying a boundary portion 'A' of a high gradation, which is varied from a low gradation to a high gradation, become brighter in a uniform manner. Thus, display defects such as a crosstalk, etc., generated due to a voltage variation of a data line at the boundary portion 'A' may be prevented.

Figure 11:
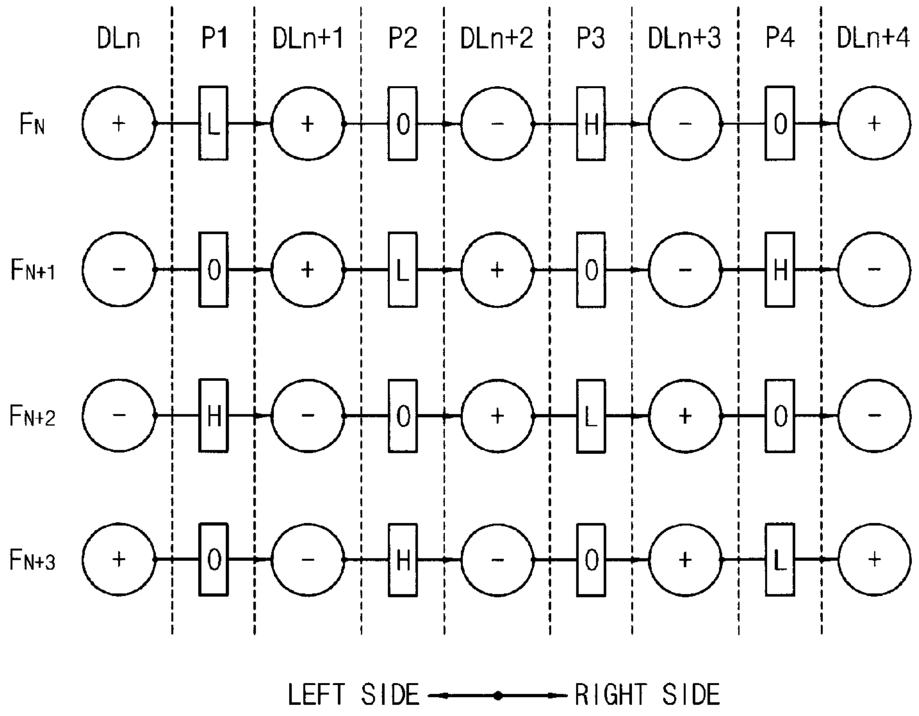
FIG. 11 is a schematic diagram explaining a voltage variation of pixels when a second test pattern is displayed on the display panel of FIG. 9.

FIG. 11 is a schematic diagram explaining a voltage variation of pixels when a second test pattern is displayed on the exemplary display panel of FIG. 9.

Referring to FIGS. 7A, 7B and 11, the display panel 400 displays a second test pattern TP2 including a grey box pattern 'G' displayed on a white background screen 'W' in accordance with a one-frame right side shift inversion method. In this case, a luminance distribution in accordance with voltage variations of first, second, third and fourth pixels P1, P2, P3 and P4 positioned at a boundary portion 'B' of the white background screen 'W' of pixels displaying the grey box pattern 'G' will be described.

A luminance distribution according to a voltage variation of the first, second, third and fourth pixels P1, P2, P3 and P4 during an (N+1)-th frame $F_{N+1}$ will be described as follows.

The first pixel P1 is electrically connected to an n-th data line DLn positioned at a first side thereof, and is adjacent to an (n+1)-th data line DLn+1 positioned at a second side opposite to the first side. A white voltage (−White) of a second polarity (−) is applied to the n-th data line DLn during a first interval T1, and a gray voltage (−Gray) of the second polarity (−) is applied to the n-th data line DLn during a second interval T2. A white voltage (+White) of a first polarity (+) is applied to the (n+1)-th data line DLn+1 during a first interval T1, and a gray voltage (+Gray) of the first polarity (+) is applied to the (n+1)-th data line DLn+1 during a second interval T2. Thus, a variation component is offset due to the (n)-th and (n+1)-th data lines DLn and DLn+1 having opposite voltage variations to each other, so that the first pixel P1 positioned at the boundary portion 'B' has a target luminance.

The second pixel P2 is electrically connected to an (n+1)-th data line DLn+1 positioned at a first side thereof, and is adjacent to an (n+2)-th data line DLn+2 positioned at a second side opposite to the first side. A white voltage (+White) of a first polarity (+) is applied to the (n+1)-th and (n+2)-th data lines DLn+1 and DLn+2 during a first interval T1, and a gray voltage (+Gray) of the first polarity (+) is applied to the (n+1)-th and (n+2)-th data lines DLn+1 and DLn+2 during a second interval T2. Thus, a voltage of the second pixel P2 positioned at the boundary portion 'B' is shifted in a low direction 'L' due to a voltage of the (n+1)-th and (n+2)-th data lines DLn+1 and DLn+2, which varies from a white voltage (+White) of a first polarity (+) to a gray voltage (+Gray) of a first polarity (+). Thus, a voltage of the second pixel P2 is shifted in a low direction 'L' due to a voltage variation of the (n+1)-th and (n+2)-th data lines DLn+1 and DLn+2, so that the first pixel P1 has a luminance darker than a target luminance.

The third pixel P3 is electrically connected to an (n+2)-th data line DLn+2 positioned at a first side thereof, and is adjacent to an (n+3)-th data line DLn+3 positioned at a second side opposite to the first side. A white voltage (+White) of a first polarity (+) is applied to the (n+2)-th data line DLn+2 during a first interval T1, and a gray voltage (+Gray) of the first polarity (+) is applied to the (n+2)-th data line DLn+2 during a second interval T2. A white voltage (−White) of a second polarity (−) is applied to the (n+3)-th data line DLn+3 during a first interval T1, and a gray voltage (−Gray) of the second polarity (−) is applied to the (n+3)-th data line DLn+3 during a second interval T2. Thus, a voltage of the third pixel P3 positioned at the boundary portion 'B' is shifted in a low direction 'L' due to a voltage of the (n+2)-th data line DLn+2, which varies from a white voltage (+White) of a first polarity (+) to a gray voltage (+Gray) of a first polarity (+). However, a voltage of the third pixel P3 is shifted in a high direction 'H' due to a voltage of the (n+3)-th data line DLn+3, which varies from a white voltage (−White) of a second polarity (−) to a gray voltage (−Gray) of a second polarity (−). As a result, a variation component is offset due to the (n+2)-th and (n+3)-th data lines DLn+2 and DLn+3 having opposite voltage variations to each other, so that the third pixel P3 has a target luminance.

The fourth pixel P4 is electrically connected to an (n+3)-th data line DLn+3 positioned at a first side thereof, and is adjacent to an (n+4)-th data line DLn+4 positioned at a second side opposite to the first side. A white voltage (−White) of a second polarity (−) is applied to the (n+3)-th and (n+4)-th data lines DLn+3 and DLn+4 during a first interval T1, and a gray voltage (−Gray) of the second polarity (−) is applied to the (n+3)-th and (n+4)-th data lines DLn+3 and DLn+4 during a second interval T2. Thus, a voltage of the fourth pixel P4 positioned at the boundary portion 'B' is shifted in a high direction 'H' due to a voltage variation of the (n+3)-th and (n+4)-th data lines DLn+3 and DLn+4. Therefore, a voltage of the fourth pixel P4 is shifted in a high direction 'H' due to a voltage variation of the (n+3)-th and (n+4)-th data lines DLn+3 and DLn+4, so that the fourth pixel P4 has a luminance darker than a target luminance.

Since a voltage of the second pixel P2 is shifted in a low direction 'L' at a first polarity (+) and a voltage of the fourth pixel P4 is shifted in a high direction 'H' at a second polarity (−) during an (N+1)-th frame $F_{N+1}$, a luminance of the second and fourth pixels P2 and P4 is increased. Since voltages of the first and third pixels P1 and P3 are not shifted, a luminance of the first and third pixels P1 and P3 is not varied during the (N+1)-th frame $F_{N+1}$.

Since a voltage of the first pixel P1 is shifted in a high direction 'H' at a second polarity (−) and a voltage of the third pixel P3 is shifted in a low direction 'L' at a first polarity (+) during the (N+2)-th frame $F_{N+2}$, a luminance of the first and third pixels P1 and P3 is decreased. Since voltages of the second and fourth pixels P2 and P4 are not shifted, a luminance of the second and fourth pixels P2 and P4 is not varied during the (N+2)-th frame $F_{N+2}$.

According to the one-frame right side shift inversion method, pixels of the test pattern displaying a boundary portion 'B' of a low gradation, which is varied from a high gradation to a low gradation, become darker in a uniform manner. Thus, display defects such as a crosstalk, etc., generated due to a voltage variation of a data line at the boundary portion 'B' may be prevented.

Figure 12:
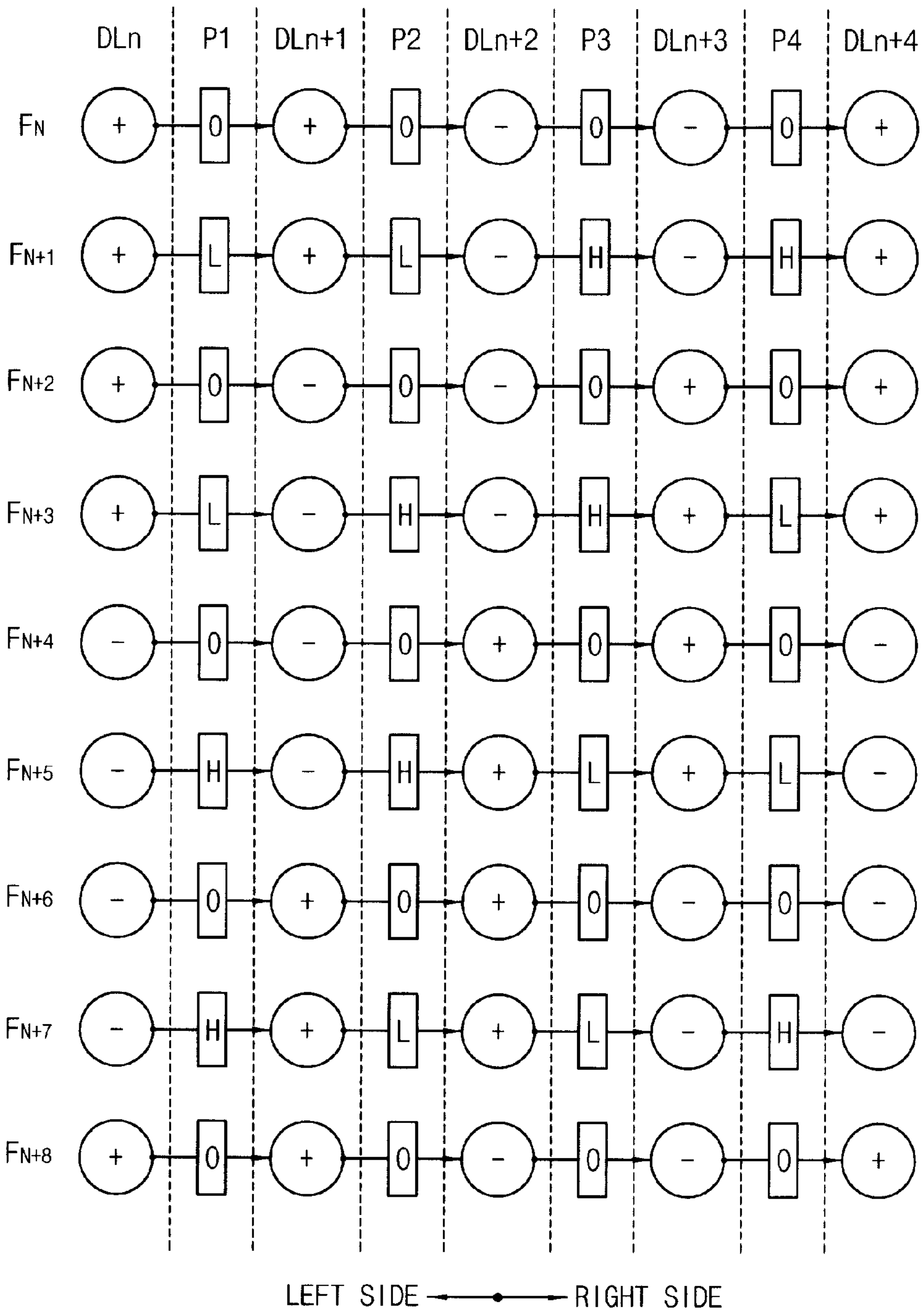
FIG. 12 is a schematic diagram explaining a further exemplary embodiment of a method of driving an exemplary display panel according to the present invention.

FIG. 12 is a schematic diagram explaining still another exemplary embodiment of a method of driving an exemplary display panel according to the present invention.

Referring to FIGS. 3, 4 and 12, the data driving part 530 applies voltages to the data lines in accordance with a two-frame left side shift inversion method. The data driving part 530 applies data voltages of polarities such as +, +, −, −, + to the data lines DLn, DLn+1, DLn+2, DLn+3 and DLn+4, respectively, (where 'n' is a natural number) during an N-th frame $F_N$ and an (N+1)-th frame $F_{N+1}$, and applies data voltages of polarities such as +, −, −, +, + to the data lines DLn, DLn+1, DLn+2, DLn+3 and DLn+4, respectively, during an (N+2)-th frame $F_{N+2}$ and (N+3)-th frame $F_{N+3}$ in accordance with a two-frame left side shift inversion method. Moreover, the data driving part 530 applies data voltages of polarities such as −, −, +, +, −, to the data lines DLn, DLn+1, DLn+2, DLn+3 and DLn+4, respectively, during an (N+4)-th frame $F_{N+4}$ and (N+5)-th frame $F_{N+5}$, and applies data voltages of polarities such as −, +, +, −, −, to the data lines DLn, DLn+1, DLn+2, DLn+3 and DLn+4, respectively, during an (N+6)-th frame $F_{N+6}$ and (N+7)-th frame $F_{N+7}$ in accordance with the two-frame left side shift inversion method.

As shown in FIG. 12, when it varies from an odd numbered frame to an even numbered frame, a polarity of voltages applied to the data lines DLn, DLn+1, DLn+2, DLn+3 and DLn+4 during an N-th frame $F_N$ and a polarity of voltages applied to the data lines DLn, DLn+1, DLn+2, DLn+3 and DLn+4 during an (N+1)-th frame $F_{N+1}$ are not varied, but constantly maintained. Thus, since polarities of voltages of the data lines DLn, DLn+1, DLn+2, DLn+3 and DLn+4 are not varied during a vertical blank interval between the N-th frame $F_N$ and the (N+1)-th frame $F_{N+1}$ a polarity of the voltages of the first, second, third and fourth pixels P1, P2, P3 and P4 are not varied ("0").

When it varies from an even numbered frame to an odd numbered frame, data voltages of polarities such as +, +, −, −, + are applied to the data lines DLn, DLn+1, DLn+2, DLn+3 and DLn+4 during an (N+1)-th frame $F_{N+1}$, and data voltages of polarities such as +, −, −, +, + are applied to the data lines DLn, DLn+1, DLn+2, DLn+3 and DLn+4 during an (N+2)-th frame $F_{N+2}$.

The first pixel P1 is electrically connected to an n-th data line DLn positioned at a first side thereof, and is adjacent to an (n+1)-th data line DLn+1 positioned at a second side opposite to the first side. When it varies from an N-th frame $F_N$ to an (N+1)-th frame $F_{N+1}$, a polarity variation is not generated at the n-th data line DLn. In contrast, when it varies from the (N+1)-th frame $F_{N+1}$ to the (N+2)-th frame $F_{N+2}$, a polarity of the (n+1)-th data line DLn+1 is varied from a first polarity (+) to a second polarity (−). Thus, a voltage of the first pixel P1 is shifted in a low direction 'L' during a vertical blank interval between the (N+1)-th frame $F_{N+1}$ and the (N+2)-th frame $F_{N+2}$.

The second pixel P2 is electrically connected to an (n+1)-th data line DLn+1 positioned at a first side thereof, and is adjacent to an (n+2)-th data line DLn+2 positioned at a second side opposite to the first side. When it varies from the N-th frame to the (N+1)-th frame, a polarity variation is not generated at the (n+2)-th data line DLn+2. In contrast, when it varies from the (N+1)-th frame $F_{N+1}$ to the (N+2)-th frame $F_{N+2}$, a polarity of the (n+1)-th data line DLn+1 is varied from a first polarity (+) to a second polarity (−). Thus, a voltage of the second pixel P2 is shifted in a low direction 'L' during the vertical blank interval between the (N+1)-th frame $F_{N+1}$ and the (N+2)-th frame $F_{N+2}$.

The third pixel P3 is electrically connected to an (n+2)-th data line DLn+2 positioned at a first side thereof, and is adjacent to an (n+3)-th data line DLn+3 positioned at a second side opposite to the first side. When it varies from the N-th frame to the (N+1)-th frame, a polarity variation is not generated at the (n+2)-th data line DLn+2. When it varies from the (N+1)-th frame $F_{N+1}$ to the (N+2)-th frame $F_{N+2}$, a polarity of the (n+3)-th data line DLn+3 is varied from a second polarity (−) to a first polarity (+). Thus, a voltage of the third pixel P3 is shifted in a high direction 'H' during the vertical blank interval between the (N+1)-th frame $F_{N+1}$ and the (N+2)-th frame $F_{N+2}$.

The fourth pixel P4 is electrically connected to an (n+3)-th data line DLn+3 positioned at a first side thereof, and is adjacent to an (n+4)-th data line DLn+4 positioned at a second side opposite to the first side. When it varies from the N-th frame to the (N+1)-th frame, a polarity variation is not generated at the (n+4)-th data line DLn+4. When it varies from the (N+1)-th frame $F_{N+1}$ to the (N+2)-th frame $F_{N+2}$, a polarity of the (n+3)-th data line DLn+3 is varied from a second polarity (−) to a first polarity (+). Thus, a voltage of the fourth pixel P4 is shifted in a high direction 'H' during the vertical blank interval between the (N+1)-th frame $F_{N+1}$ and the (N+2)-th frame $F_{N+2}$.

According to the above method, during a vertical blank interval between the (N+3)-th frame $F_{N+3}$ and the (N+4)-th frame $F_{N+4}$, voltages of the first and fourth pixels P1 and P4 are shifted in the low direction 'L', and voltages of the second and third pixels P2 and P3 are shifted in the high direction 'H'. During a vertical blank interval between the (N+5)-th frame $F_{N+5}$ and the (N+6)-th frame $F_{N+6}$, voltages of the first and second pixels P1 and P2 are shifted in the high direction 'H', and voltages of the third and fourth pixels P3 and P4 are shifted in the low direction 'L'. During a vertical blank interval between the (N+7)-th frame $F_{N+7}$ and the (N+8)-th frame $F_{N+8}$, voltages of the first and fourth pixels P1 and P4 are shifted in the high direction 'H', and voltages of the second and third pixels P2 and P3 are shifted in the low direction 'L'.

As a result, a voltage variation of the first to fourth pixels P1, P2, P3 and P4 is not generated during a vertical blank interval between an odd numbered frame and an even numbered frame, and the number of pixels in which a voltage applied to a pixel electrode is shifted along a low direction 'L' is substantially equal to the number of pixels in which a voltage applied to a pixel electrode is shifted along a high direction 'H' during a vertical blank interval between an even numbered frame and an odd numbered frame. Thus, display defects such as a greenish phenomenon, vertical-line defects, etc., due to a voltage variation of a data line may be prevented.

Moreover, when a vertical strip pattern is displayed, shift directions of pixels displaying color are uniform so that display defects are not viewed.

Figure 13:
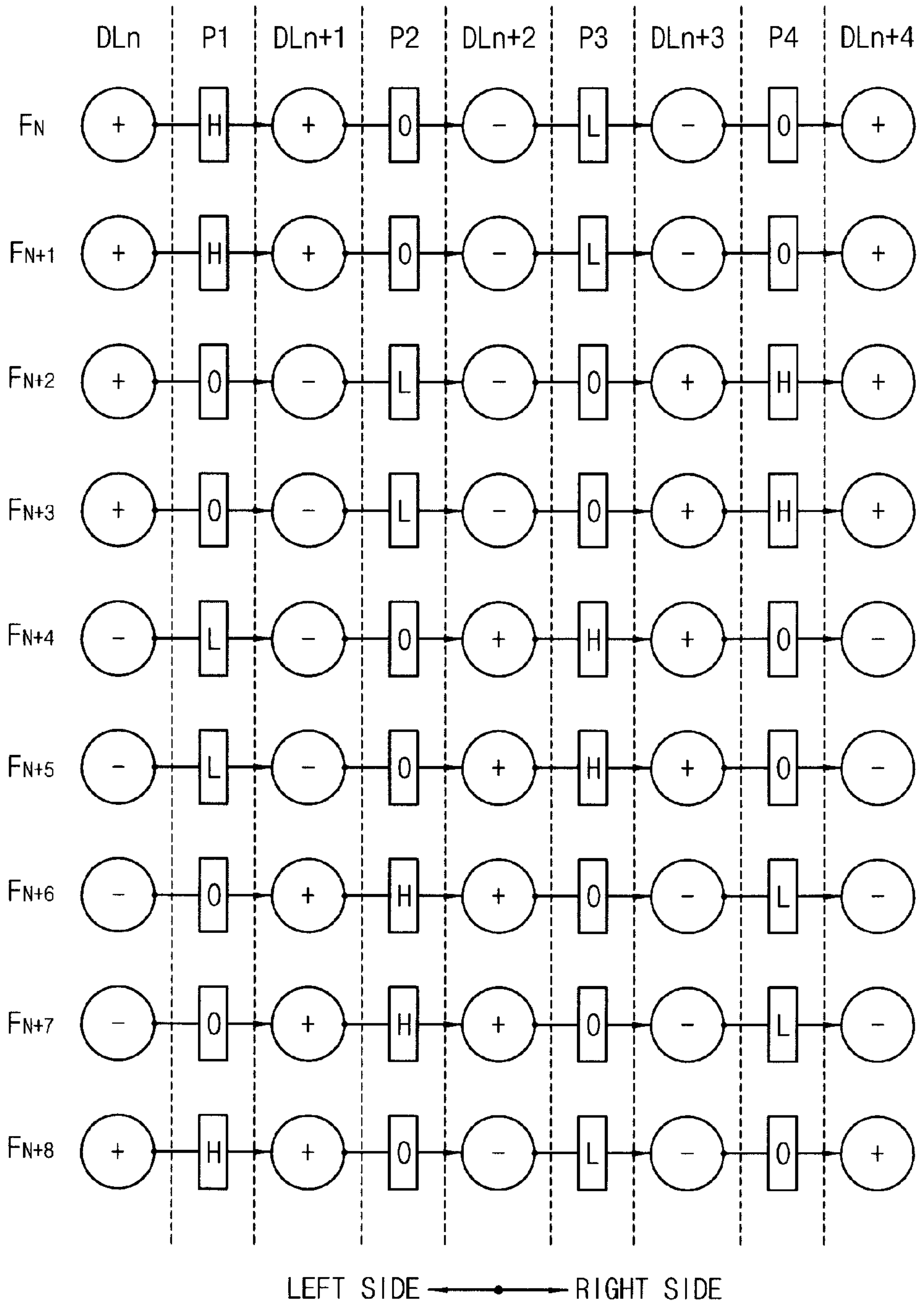
FIG. 13 is a schematic diagram explaining a voltage variation of pixels when a first test pattern is displayed on the display panel of FIG. 12.

FIG. 13 is a schematic diagram explaining a voltage variation of pixels when a first test pattern is displayed on the exemplary display panel of FIG. 12.

Referring to FIGS. 6A, 6B and 13, the display panel 400 displays a first test pattern TP1 including a white box pattern 'W' displayed on a grey background screen 'G' in accordance with a two-frame left side shift inversion method. In this case, a luminance distribution in accordance with voltage variations of first, second, third and fourth pixels P1, P2, P3 and P4 positioned at a boundary portion 'A' of the grey background screen 'G' of pixels displaying the white box pattern 'W' will be described.

A luminance distribution according to a voltage variation of the first, second, third and fourth pixels P1, P2, P3 and P4 during an N-th frame $F_N$ and an (N+1)-th frame $F_{N+1}$ will be described as follow.

The first pixel P1 is electrically connected to an n-th data line DLn positioned at a first side thereof, and is adjacent to an (n+1)-th data line DLn+1 positioned at a second side opposite to the first side. A gray voltage (+Gray) of a first polarity (+) is applied to the n-th and (n+1)-th data lines DLn and DLn+1 during a first interval T1, and a white voltage (+White) of the first polarity (+) is applied to the n-th and (n+1)-th data lines DLn and DLn+1 during a second interval T2. Thus, in the first pixel P1 positioned at the boundary portion 'A', a voltage applied to the n-th data line DLn is varied from a gray voltage (+Gray) of a first polarity (+) to a white voltage (+White), so that a voltage of the first pixel P1, which is applied to a pixel electrode, is shifted in a high direction 'H'. Thus, the first pixel P1 has a luminance brighter than a target luminance.

The second pixel P2 is electrically connected to an (n+1)-th data line DLn+1 positioned at a first side thereof, and is adjacent to an (n+2)-th data line DLn+2 positioned at a second side opposite to the first side. A gray voltage (+Gray) of a first polarity (+) is applied to the (n+1)-th data line DLn+1 during a first interval T1, and a white voltage (+White) of the first polarity (+) is applied to the (n+1)-th data line DLn+1 during a second interval T2. A gray voltage (−Gray) of a second polarity (−) is applied to the (n+2)-th data line DLn+2 during a first interval T1, and a white voltage (−White) of the second polarity (−) is applied to the (n+2)-th data line DLn+2 during a second interval T2. Thus, a voltage of the second pixel P2 positioned at the boundary portion 'A' is shifted in a high direction 'H' due to a voltage of the (n+1)-th data line DLn+1, which varies from a gray voltage (+Gray) of a first polarity (+) to a white voltage (+White) of a first polarity (+). However, a voltage of the second pixel P2 is shifted in a low direction 'L' due to a voltage of the (n+2)-th data line DLn+2, which varies from a gray voltage (−Gray) of a second polarity (−) to a white voltage (−White) of a second polarity (−). As a result, a variation component is offset due to the (n+1)-th and (n+2)-th data lines DLn+1 and DLn+2 having opposite voltage variations to each other, so that the second pixel P2 has a target luminance.

The third pixel P3 is electrically connected to an (n+2)-th data line DLn+2 positioned at a first side thereof, and is adjacent to an (n+3)-th data line DLn+3 positioned at a second side opposite to the first side. A gray voltage (−Gray) of a second polarity (−) is applied to the (n+2)-th and (n+3)-th data lines DLn+2 and DLn+3 during a first interval T1, and a white voltage (−White) of the second polarity (−) is applied to the (n+2)-th and (n+3)-th data lines DLn+2 and DLn+3 during a second interval T2. Thus, a voltage of the third pixel P3 positioned at the boundary portion 'A' is shifted in a low direction 'L' due to a voltage of the (n+2)-th and (n+3)-th data lines DLn+2 and DLn+3, which varies from a gray voltage (−Gray) of a second polarity (−) to a white voltage (−White) of a second polarity (−). Thus, the third pixel P3 has a luminance brighter than a target luminance.

The fourth pixel P4 is electrically connected to an (n+3)-th data line DLn+3 positioned at a first side thereof, and is adjacent to an (n+4)-th data line DLn+4 positioned at a second side opposite to the first side. A gray voltage (−Gray) of a second polarity (−) is applied to the (n+3)-th data line DLn+3 during a first interval T1, and a white voltage (−White) of the second polarity (−) is applied to the (n+3)-th data line DLn+3 during a second interval T2. A gray voltage (+Gray) of a first polarity (+) is applied to the (n+4)-th data line DLn+4 during a first interval T1, and a white voltage (+White) of the first polarity (+) is applied to the (n+4)-th data line DLn+4 during a second interval T2. Thus, a voltage of the fourth pixel P4 positioned at the boundary portion 'A' is shifted in a low direction 'L' due to a voltage of the (n+3)-th data line DLn+3, which varies from a gray voltage (−Gray) of a second polarity (−) to a white voltage (−White) of a second polarity (−). However, a voltage of the fourth pixel P4 is shifted in a high direction 'H' due to a voltage of the (n+4)-th data line DLn+4, which varies from a gray voltage (+Gray) of a first polarity (+) to a white voltage (+White) of a first polarity (+). As a result, a variation component is offset due to the (n+3)-th and (n+4)-th data lines DLn+3 and DLn+4 having opposite voltage variations to each other, so that the fourth pixel P4 has a target luminance.

During the N-th frame $F_N$ and the (N+1)-th frame $F_{N+1}$, a voltage of the first pixel P1 is shifted in a high direction 'H' at a first polarity (+) and a voltage of the third pixel P3 is shifted in a low direction 'L' at a second polarity (−), so that the first and third pixels P1 and P3 become brighter. Since voltages of the second and fourth pixels P2 and P4 are not shifted, a luminance of the second and fourth pixels P2 and P4 is not varied during the N-th frame $F_N$ and the (N+1)-th frame $F_{N+1}$.

According to the above method, since a voltage of the second pixel P2 is shifted in a low direction 'L' at a second polarity (−) and a voltage of the fourth pixel P4 is shifted in a high direction 'H' at a first polarity (+) during an (N+2)-th frame $F_{N+2}$ and an (N+3)-th frame $F_{N+3}$, the second and fourth pixels P2 and P4 become brighter. Since voltages of the first and third pixels P1 and P3 are not shifted, a luminance of the first and third pixels P1 and P3 is not varied during the (N+2)-th frame $F_{N+2}$ and an (N+3)-th frame $F_{N+3}$. Since a voltage of the first pixel P1 is shifted in a low direction 'L' at a second polarity (−) and a voltage of the third pixel P3 is shifted in a high direction 'H' at a first polarity (+) during an (N+4)-th frame $F_{N+4}$ and an (N+5)-th frame $F_{N+5}$, the first and third pixels P1 and P3 become brighter. Since voltages of the second and fourth pixels P2 and P4 are not shifted, a luminance of the second and fourth pixels P2 and P4 is not varied during the (N+4)-th frame $F_{N+4}$ and the (N+5)-th frame $F_{N+5}$. Since a voltage of the second pixel P2 is shifted in a high direction 'H' at a first polarity (+) and a voltage of the fourth pixel P4 is shifted in a low direction 'L' at a second polarity (−) during an (N+6)-th frame $F_{N+6}$ and an (N+7)-th frame $F_{N+7}$, the second and fourth pixels P2 and P4 become brighter. Since voltages of the first and third pixels P1 and P3 are not shifted, a luminance of the first and third pixels P1 and P3 is not varied during the (N+6)-th frame $F_{N+6}$ and the (N+7)-th frame $F_{N+7}$.

As described above, pixels of the test pattern displaying a boundary portion 'A' of a high gradation, which is varied from a low gradation to a high gradation, become brighter in a uniform manner. Thus, display defects such as a crosstalk, etc., generated due to a voltage variation of a data line at the boundary portion 'A' may be prevented.

Figure 14:
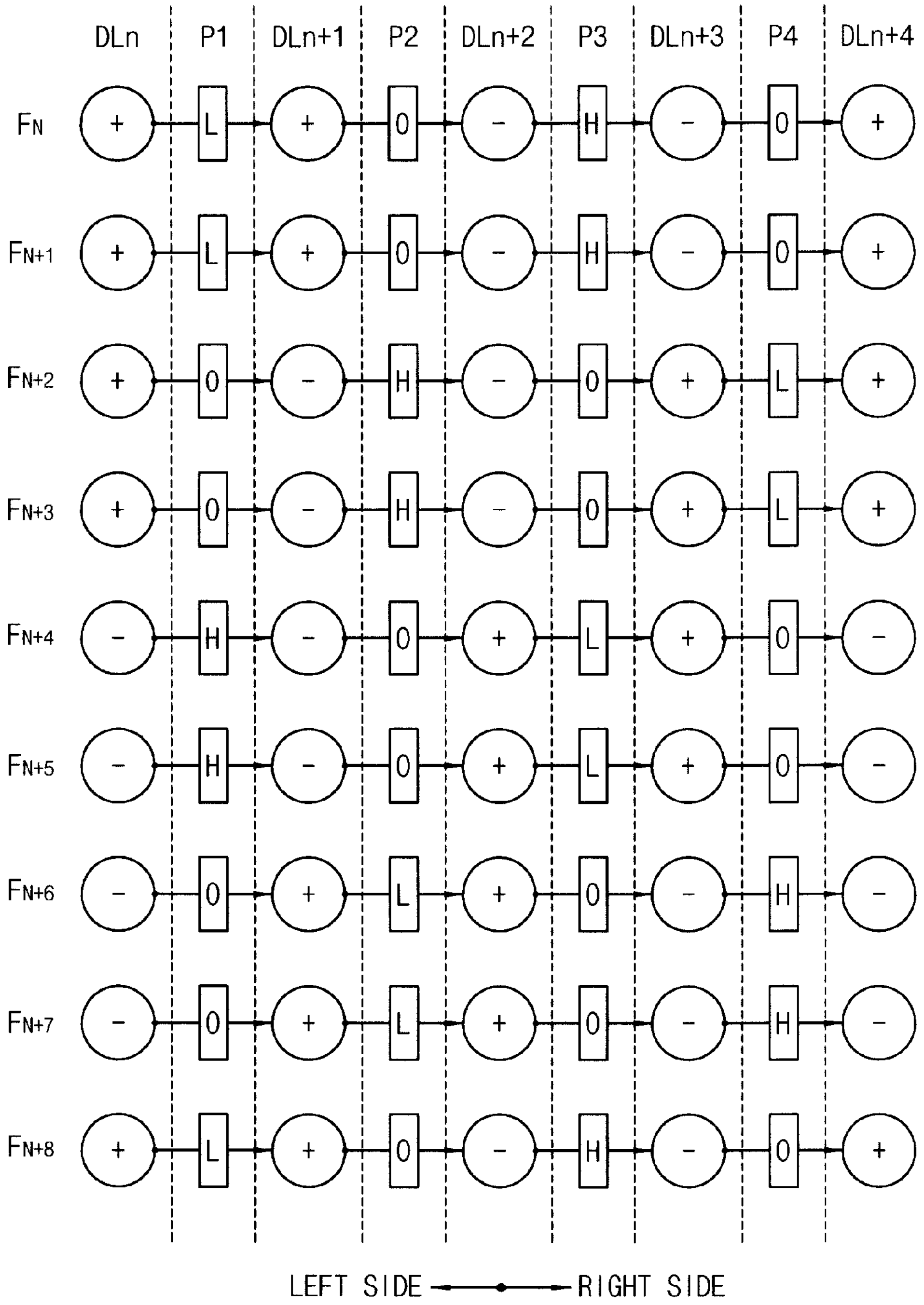
FIG. 14 is a schematic diagram explaining a voltage variation of pixels when a second test pattern is displayed on the display panel of FIG. 12.

FIG. 14 is a schematic diagram explaining a voltage variation of pixels when a second test pattern is displayed on the exemplary display panel of FIG. 12.

Referring to FIGS. 7A, 7B and 14, the display panel 400 displays a second test pattern TP2 in accordance with a two-frame left side shift inversion method. The second test pattern TP2 includes a grey box pattern 'G' displayed on a white background screen 'W'. In this case, a luminance distribution in accordance with voltage variations of first, second, third and fourth pixels P1, P2, P3 and P4 positioned at a boundary portion 'B' of the white background screen 'W' of pixels displaying the grey box pattern 'G' will be described.

A luminance distribution according to a voltage variation of the first, second, third and fourth pixels P1, P2, P3 and P4 during an N-th frame $F_N$ and an (N+1)-th frame $F_{N+1}$ will be described as follow.

The first pixel P1 is electrically connected to an n-th data line DLn positioned at a first side thereof, and is adjacent to an (n+1)-th data line DLn+1 positioned at a second side opposite to the first side. A white voltage (+White) of a first polarity (+) is applied to the n-th and (n+1)-th data lines DLn and DLn+1 during a first interval T1, and a gray voltage (+Gray) of the first polarity (+) is applied to the n-th and (n+1)-th data lines DLn and DLn+1 during a second interval T2. Thus, in the first pixel P1 positioned at the boundary portion 'B', a voltage applied to the n-th and (n+1)-th data lines DLn and DLn+1 is varied from a white voltage (+White) of a first polarity (+) to a gray voltage (+Gray), so that a voltage of the first pixel P1 is shifted in a low direction 'L'. Thus, a voltage of the first pixel P1 is shifted in a low direction 'L' due to a voltage variation of the n-th and (n+1)-th data lines DLn and DLn+1, so that the first pixel P1 has a luminance darker than a target luminance.

The second pixel P2 is electrically connected to an (n+1)-th data line DLn+1 positioned at a first side thereof, and is adjacent to an (n+2)-th data line DLn+2 positioned at a second side opposite to the first side. A white voltage (+White) of a first polarity (+) is applied to the (n+1)-th data line DLn+1 during a first interval T1, and a gray voltage (+Gray) of the first polarity (+) is applied to the (n+1)-th data line DLn+1 during a second interval T2. A white voltage (−White) of a second polarity (−) is applied to the (n+2)-th data line DLn+2 during a first interval T1, and a gray voltage (−Gray) of the second polarity (−) is applied to the (n+2)-th data line DLn+2 during a second interval T2. Thus, a voltage of the second pixel P2 positioned at the boundary portion 'B' is shifted in a low direction 'L' due to a voltage of the (n+1)-th data line DLn+1, which varies from a white voltage (+White) of a first polarity (+) to a gray voltage (+Gray) of a first polarity (+). However, a voltage of the second pixel P2 is shifted in a high direction 'H' due to a voltage of the (n+2)-th data line DLn+2, which varies from a white voltage (−White) of a second polarity (−) to a gray voltage (+Gray) of a second polarity (−). As a result, a variation component is offset due to the (n+1)-th and (n+2)-th data lines DLn+1 and DLn+2 having opposite voltage variations to each other, so that the second pixel P2 has a target luminance.

The third pixel P3 is electrically connected to an (n+2)-th data line DLn+2 positioned at a first side thereof, and is adjacent to an (n+3)-th data line DLn+3 positioned at a second side opposite to the first side. A white voltage (−White) of a second polarity (−) is applied to the (n+2)-th and (n+3)-th data lines DLn+2 and DLn+3 during a first interval T1, and a gray voltage (−Gray) of the second polarity (−) is applied to the (n+2)-th and (n+3)-th data lines DLn+2 and DLn+3 during a second interval T2. Thus, a voltage of the third pixel P3 positioned at the boundary portion 'B' is shifted in a high direction 'H' due to a voltage variation of the (n+2)-th and (n+3)-th data lines DLn+2 and DLn+3. Therefore, a voltage of the third pixel P3 is shifted in a high direction 'H' due to a voltage variation of the (n+2)-th and (n+3)-th data lines DLn+2 and DL+3, so that the third pixel P3 has a luminance darker than a target luminance.

The fourth pixel P4 is electrically connected to an (n+3)-th data line DLn+3 positioned at a first side thereof, and is adjacent to an (n+4)-th data line DLn+4 positioned at a second side opposite to the first side. A white voltage (−White) of a second polarity (−) is applied to the (n+3)-th data line DLn+3 during a first interval T1, and a gray voltage (−Gray) of the second polarity (−) is applied to the (n+3)-th data line DLn+3 during a second interval T2. A white voltage (+White) of a first polarity (+) is applied to the (n+4)-th data line DLn+4 during a first interval T1, and a gray voltage (+Gray) of the first polarity (+) is applied to the (n+4)-th data line DLn+4 during a second interval T2. Thus, a variation component is offset due to the (n+3)-th and (n+4)-th data lines DLn+3 and DLn+4 having opposite voltage variations to each other, so that the second pixel P4 positioned at the boundary portion 'B' has a target luminance.

Since a voltage of the first pixel P1 is shifted in a low direction 'L' at a first polarity (+) and a voltage of the third pixel P3 is shifted in a high direction 'H' at a second polarity (−) during an N-th frame $F_N$ and an (N+1)-th frame $F_{N+1}$, a luminance of the first and third pixels P1 and P3 becomes darker. Since voltages of the second and fourth pixels P2 and P4 are not shifted, a luminance of the second and fourth pixels P2 and P4 is not varied during the N-th frame $F_N$ and the (N+1)-th frame $F_{N+1}$.

According to the above method, since a voltage of the second pixel P2 is shifted in a high direction 'H' at a second polarity (−) and a voltage of the fourth pixel P4 is shifted in a low direction 'L' at a first polarity (+) during an (N+2)-th frame $F_{N+2}$ and an (N+3)-th frame $F_{N+3}$, a luminance of the second and fourth pixels P2 and P4 becomes darker. Since voltages of the first and third pixels P1 and P3 are not shifted, a luminance of the first and third pixels P1 and P3 is not varied during the (N+2)-th frame $F_{N+2}$ and the (N+3)-th frame $F_{N+3}$. Since a voltage of the first pixel P1 is shifted in a high direction 'H' at a second polarity (−) and a voltage of the third pixel P3 is shifted in a low direction 'L' at a first polarity (+) during an (N+4)-th frame $F_{N+4}$ and an (N+5)-th frame $F_{N+5}$, a luminance of the first and third pixels P1 and P3 becomes darker. Since voltages of the second and fourth pixels P2 and P4 are not shifted, a luminance of the second and fourth pixels P2 and P4 is not varied during the (N+4)-th frame $F_{N+4}$ and the (N+5)-th frame $F_{N+5}$. Since a voltage of the second pixel P2 is shifted in a low direction 'L' at a first polarity (+) and a voltage of the fourth pixel P4 is shifted in a high direction 'H' at a second polarity (−) during an (N+6)-th frame $F_{N+6}$ and an (N+7)-th frame $F_{N+7}$, a luminance of the second and fourth pixels P2 and P4 becomes darker. Since voltage of the first and third pixels P1 and P3 are not shifted, a luminance of the first and third pixels P1 and P3 is not varied during the (N+6)-th frame $F_{N+6}$ and the (N+7)-th frame $F_{N+7}$.

As described above, pixels of the test pattern displaying a boundary portion 'B' of a low gradation, which is varied from a high gradation to a low gradation, become darker in a uniform manner. Accordingly, display defects such as a crosstalk, etc., generated due to a voltage variation of a data line at the boundary portion 'B' may be prevented.

Figure 15:
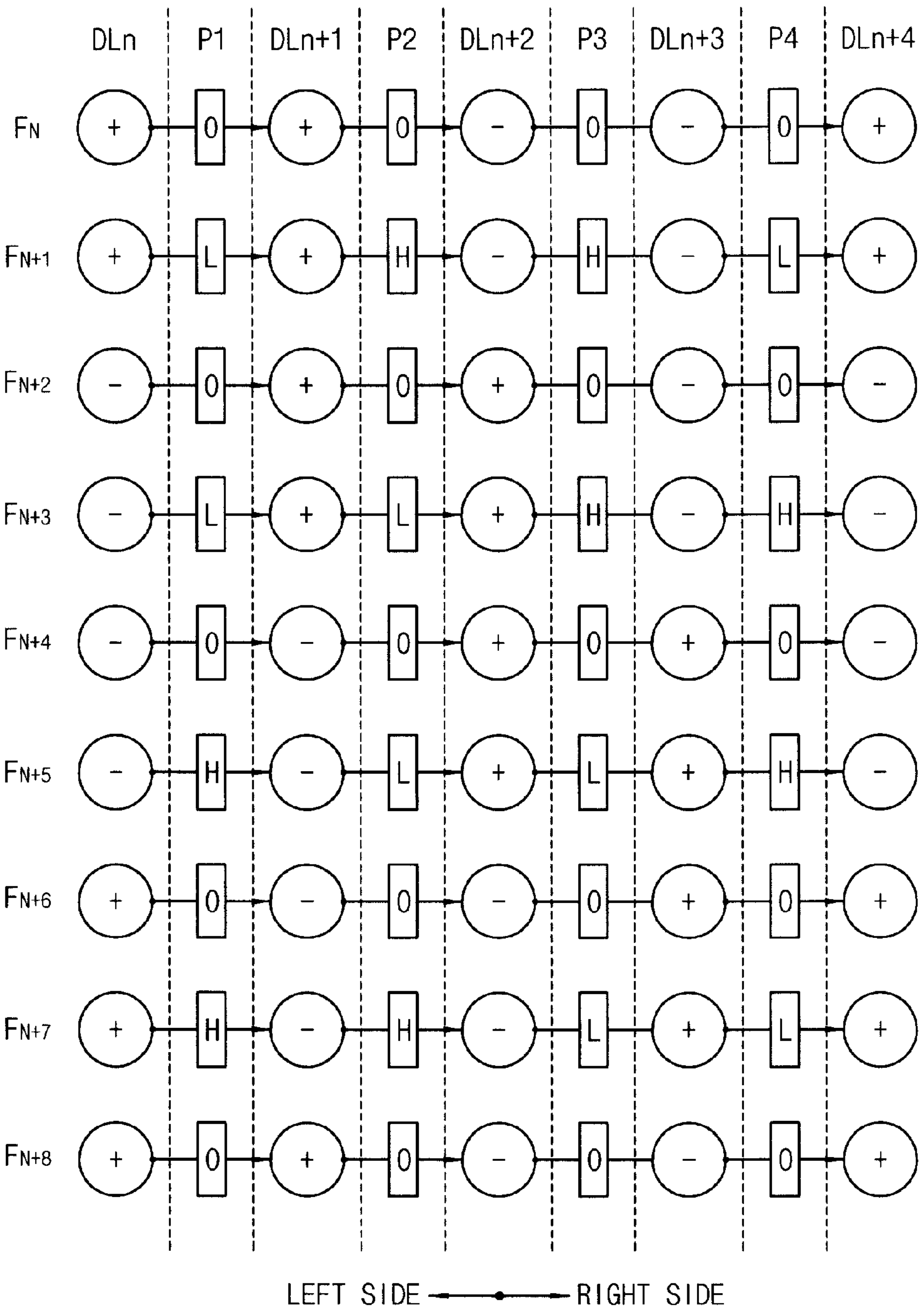
FIG. 15 is a schematic diagram explaining yet another exemplary embodiment of a method of driving an exemplary display panel according to the present invention.

FIG. 15 is a schematic diagram explaining a still further exemplary embodiment of a method of driving an exemplary display panel according to the present invention.

Referring to FIGS. 3, 4 and 15, data voltages of polarities such as +, +, −, −, + are applied to the data lines DLn, DLn+1, DLn+2, DLn+3 and DLn+4, respectively, (where 'n' is a natural number) during an N-th frame $F_N$ and an (N+1)-th frame $F_{N+1}$, and data voltages of polarities such as −, +, +, −, − are applied to the data lines DLn, DLn+1, DLn+2, DLn+3 and DLn+4, respectively, during an (N+2)-th frame $F_{N+2}$ and (N+3)-th frame $F_{N+3}$. Moreover, data voltages of polarities such as −, −, +, +, − are applied to the data lines DLn, DLn+1, DLn+2, DLn+3 and DLn+4, respectively, during an (N+4)-th frame $F_{N+4}$ and (N+5)-th frame $F_{N+5}$, and data voltages of polarities such as +, −, −, +, + are applied to the data lines DLn, DLn+1, DLn+2, DLn+3 and DLn+4, respectively, during an (N+6)-th frame $F_{N+6}$ and (N+7)-th frame $F_{N+7}$.

As shown in FIG. 15, when it varies from an odd numbered frame to an even numbered frame, a polarity of voltages applied to the data lines DLn, DLn+1, DLn+2, DLn+3 and DLn+4 during an N-th frame $F_N$ and a polarity of voltages applied to the data lines DLn, DLn+1, DLn+2, DLn+3 and DLn+4 during an (N+1)-th frame $F_{N+1}$ are not varied but constantly maintained. Thus, since polarities of voltages of the data lines DLn, DLn+1, DLn+2, DLn+3 and DLn+4 are not varied during a vertical blank interval between the N-th frame $F_N$ and the (N+1)-th frame $F_{N+1}$, polarities of the voltages of the first, second, third and fourth pixels P1, P2, P3 and P4 are not varied ("0").

When it varies from an even numbered frame to an odd numbered frame, data voltages of polarities such as +, +, −, −, + are applied to the data lines DLn, DLn+1, DLn+2, DLn+3 and DLn+4 during an (N+1)-th frame $F_{N+1}$, and data voltages of polarities such as −, +, +, −, − are applied to the data lines DLn, DLn+1, DLn+2, DLn+3 and DLn+4 during an (N+2)-th frame $F_{N+2}$.

As shown in FIG. 15, the first pixel P1 is electrically connected to an n-th data line DLn positioned at a first side thereof, and is adjacent to an (n+1)-th data line DLn+1 positioned at a second side opposite to the first side. A voltage of a first polarity (+) is applied to the n-th and (n+1)-th data lines DLn and DLn+1 during an (N+1)-th frame $F_{N+1}$, a voltage of a second polarity (−) is applied to the n-th data line DLn during an (N+2)-th frame $F_{N+2}$, and a voltage of the first polarity (+) is applied to an (n+1)-th data line DLn+1 during the (N+2)-th frame $F_{N+2}$. Thus, a polarity of the n-th data line DLn is varied from the first polarity (+) to the second polarity (−), so that a voltage of the first pixel P1 is shifted in a low direction 'L'.

The second pixel P2 is electrically connected to an (n+1)-th data line DLn+1 positioned at a first side thereof, and is adjacent to an (n+2)-th data line DLn+2 positioned at a second side opposite to the first side. During the (N+1)-th frame $F_{N+1}$, a voltage of a first polarity (+) is applied to the (n+1)-th data line DLn+1, and a voltage of the second polarity (−) is applied to the (n+2)-th data line DLn+2. Moreover, during the (N+2)-th frame $F_{N+2}$, a voltage of the first polarity (+) is applied to the (n+1)-th data line DLn+1, and a voltage of the first polarity (+) is applied to the (n+2)-th data line DLn+2. Thus, a polarity of the (n+2)-th data line DLn+2 is varied from the second polarity (−) to the first polarity (+), so that a voltage of the second pixel P2 is shifted in a high direction 'H'.

The third pixel P3 is electrically connected to an (n+2)-th data line DLn+2 positioned at a first side thereof, and is adjacent to an (n+3)-th data line DLn+3 positioned at a second side opposite to the first side. During the (N+1)-th frame $F_{N+1}$, a voltage of a second polarity (−) is applied to the (n+2)-th data line DLn+2, and a voltage of the second polarity (−) is applied to the (n+3)-th data line DLn+3. Moreover, during the (N+2)-th frame $F_{N+2}$, a voltage of the first polarity (+) is applied to the (n+2)-th data line DLn+2, and a voltage of the second polarity (−) is applied to the (n+3)-th data line DLn+3. Thus, a polarity of the (n+3)-th data line DLn+3 is varied from the second polarity (−) to the first polarity (+), so that a voltage of the third pixel P3 is shifted in a high direction 'H'.

The fourth pixel P4 is electrically connected to an (n+3)-th data line DLn+3 positioned at a first side thereof, and is adjacent to an (n+4)-th data line DLn+4 positioned at a second side opposite to the first side. During the (N+1)-th frame $F_{N+1}$, a voltage of a second polarity (−) is applied to the (n+3)-th data line DLn+3, and a voltage of the first polarity (+) is applied to the (n+4)-th data line DLn+4. Moreover, during the (N+2)-th frame $F_{N+2}$, a voltage of the second polarity (−) is applied to the (n+3)-th data line DLn+3, and a voltage of the second polarity (−) is applied to the (n+4)-th data line DLn+4. Thus, a polarity of the (n+4)-th data line DLn+4 is varied from the first polarity (+) to the second polarity (−), so that a voltage of the fourth pixel P4 is shifted in a low direction 'L'.

According to the above method, during a vertical blank interval between the (N+3)-th frame $F_{N+3}$ and the (N+4)-th frame $F_{N+4}$, voltages of the first and second pixels P1 and P2 are shifted in the low direction 'L', and voltages of the third and fourth pixels P3 and P4 are shifted in the high direction 'H'. During a vertical blank interval between the (N+5)-th frame $F_{N+5}$ and the (N+6)-th frame $F_{N+6}$, voltages of the first and fourth pixels P1 and P4 are shifted in the high direction 'H', and voltages of the second and third pixels P2 and P3 are shifted in the low direction 'L'. During a vertical blank interval between the (N+7)-th frame $F_{N+7}$ and the (N+8)-th frame $F_{N+8}$, voltages of the first and second pixels P1 and P2 are shifted in the high direction 'H', and voltages of the third and fourth pixels P3 and P4 are shifted in the low direction 'L'.

As a result, a voltage variation of the first to fourth pixels P1, P2, P3 and P4 is not generated during a vertical blank interval between an odd numbered frame and an even numbered frame, and the number of pixels in which a voltage applied to a pixel electrode is shifted along a low direction 'L' is substantially equal to the number of pixels in which a voltage applied to a pixel electrode is shifted along a high direction 'H' during a vertical blank interval between an even numbered frame and an odd numbered frame. Thus, display defects such as a greenish phenomenon, vertical-line defects, etc., due to a voltage variation of a data line may be prevented.

Moreover, when a vertical strip pattern is displayed, shift directions of pixels displaying color are uniform so that display defects are not viewed.

Figure 16:
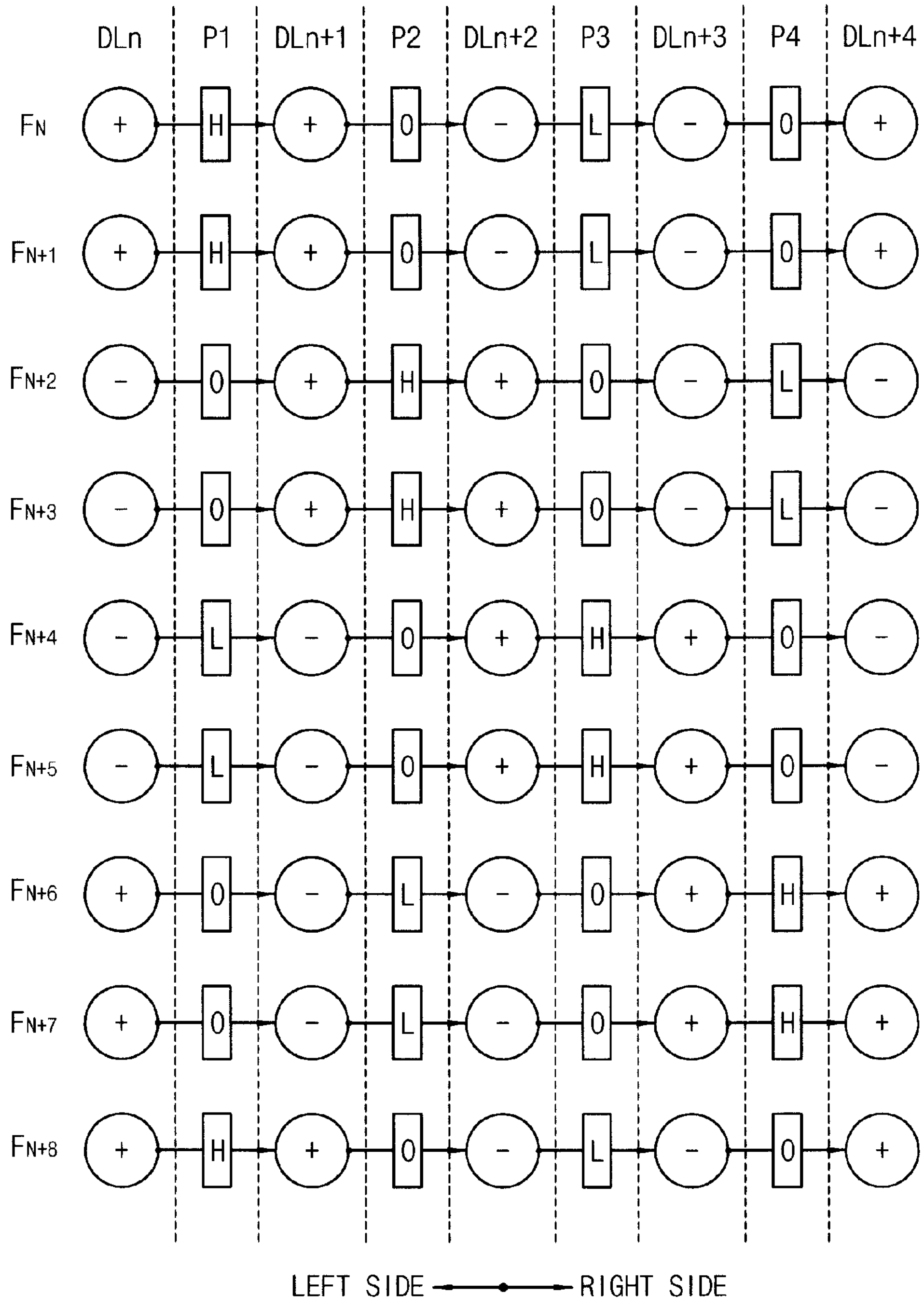
FIG. 16 is a schematic diagram explaining a voltage variation of pixels when a first test pattern is displayed on the display panel of FIG. 15.

FIG. 16 is a schematic diagram explaining a voltage variation of pixels when a first test pattern is displayed on the exemplary display panel of FIG. 15.

Referring to FIGS. 6A, 6B and 16, the display panel 400 displays a first test pattern TP1 including a white box pattern 'W' displayed on a grey background screen 'G' in accordance with a two-frame right side shift inversion method. In this case, a luminance distribution in accordance with voltage variations of first, second, third and fourth pixels P1, P2, P3 and P4 positioned at a boundary portion 'A' of the grey background screen 'G' of pixels displaying the white box pattern 'W' will be described.

A luminance distribution according to a voltage variation of the first, second, third and fourth pixels P1, P2, P3 and P4 during an N-th frame $F_N$ and an (N+1)-th frame $F_{N+1}$ is substantially equal to that of the first, second, third and fourth pixels P1, P2, P3 and P4 during an N-th frame $F_N$ described with respect to FIG. 10. A luminance distribution according to a voltage variation of the first, second, third and fourth pixels P1, P2, P3 and P4 during an (N+2)-th frame $F_{N+2}$ and an (N+3)-th frame $F_{N+3}$ is substantially equal to that of the first, second, third and fourth pixels P1, P2, P3 and P4 during an (N+1)-th frame $F_{N+1}$ described with respect to FIG. 10. A luminance distribution according to a voltage variation of the first, second, third and fourth pixels P1, P2, P3 and P4 during an (N+4)-th frame $F_{N+4}$ and an (N+5)-th frame $F_{N+5}$ is substantially equal to that of the first, second, third and fourth pixels P1, P2, P3 and P4 during an (N+2)-th frame $F_{N+2}$ described with respect to FIG. 10. A luminance distribution according to a voltage variation of the first, second, third and fourth pixels P1, P2, P3 and P4 during an (N+6)-th frame $F_{N+6}$ and an (N+7)-th frame $F_{N+7}$ is substantially equal to that of the first, second, third and fourth pixels P1, P2, P3 and P4 during an (N+3)-th frame $F_{N+3}$ described with respect to FIG. 10. Thus, any repetitive detailed explanation will hereinafter be omitted.

According to the two-frame right side shift inversion method, pixels of the first test pattern displaying a boundary portion 'A' of a high gradation, which is varied from a low gradation to a high gradation, have a uniform luminance. Thus, display defects such as a crosstalk, etc., generated due to a voltage variation of a data line at the boundary portion 'A' may be prevented.

Figure 17:
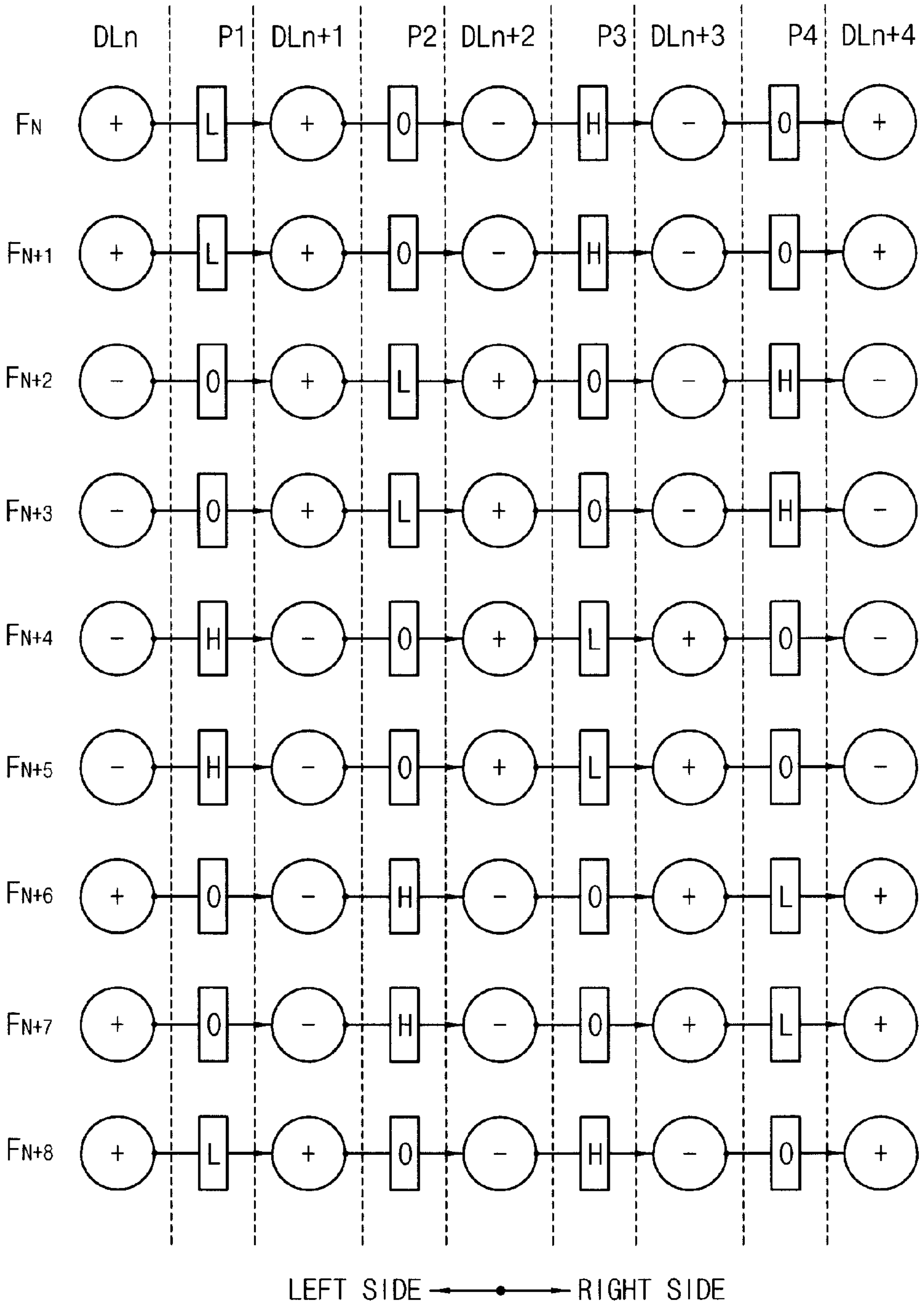
FIG. 17 is a schematic diagram explaining a voltage variation of pixels when a second test pattern is displayed on the display panel of FIG. 15.

FIG. 17 is a schematic diagram explaining a voltage variation of pixels when a second test pattern is displayed on the exemplary display panel of FIG. 15.

Referring to FIGS. 7A, 7B and 17, the display panel 400 displays a second test pattern TP2 in accordance with a two-frame right side shift inversion method. The second test pattern TP2 includes a grey box pattern 'G' displayed on a white background screen 'W'. In this case, a luminance distribution, which in accordance with voltage variations of first, second, third and fourth pixels P1, P2, P3 and P4 positioned at a boundary portion 'B' of the white background screen 'W' of pixels displaying the grey box pattern 'G', will be described.

A luminance distribution according to a voltage variation of the first, second, third and fourth pixels P1, P2, P3 and P4 during an N-th frame $F_N$ and an (N+1)-th frame $F_{N+1}$ is substantially equal to that of the first, second, third and fourth pixels P1, P2, P3 and P4 during an N-th frame $F_N$ described with respect to FIG. 11. A luminance distribution according to a voltage variation of the first, second, third and fourth pixels P1, P2, P3 and P4 during an (N+2)-th frame $F_{N+2}$ and an (N+3)-th frame $F_{N+3}$ is substantially equal to that of the first, second, third and fourth pixels P1, P2, P3 and P4 during an (N+1)-th frame $F_{N+1}$ described with respect to FIG. 11. A luminance distribution according to a voltage variation of the first, second, third and fourth pixels P1, P2, P3 and P4 during an (N+4)-th frame $F_{N+4}$ and an (N+5)-th frame $F_{N+5}$ is substantially equal to that of the first, second, third and fourth pixels P1, P2, P3 and P4 during an (N+2)-th frame $F_{N+2}$ described with respect to FIG. 11. A luminance distribution according to a voltage variation of the first, second, third and fourth pixels P1, P2, P3 and P4 during an (N+6)-th frame $F_{N+6}$ and an (N+7)-th frame $F_{N+7}$ is substantially equal to that of the first, second, third and fourth pixels P1, P2, P3 and P4 during an (N+3)-th frame $F_{N+3}$ described with respect to FIG. 11. Thus, any repetitive detailed explanation will hereinafter be omitted.

According to the two-frame right side shift inversion method, pixels of the second test pattern displaying a boundary portion 'B' of a low gradation, which is varied from a high gradation to a low gradation, have a uniform luminance. Thus, display defects such as a crosstalk, etc., generated due to a voltage variation of a data line at the boundary portion 'B' may be prevented.

Figure 18:
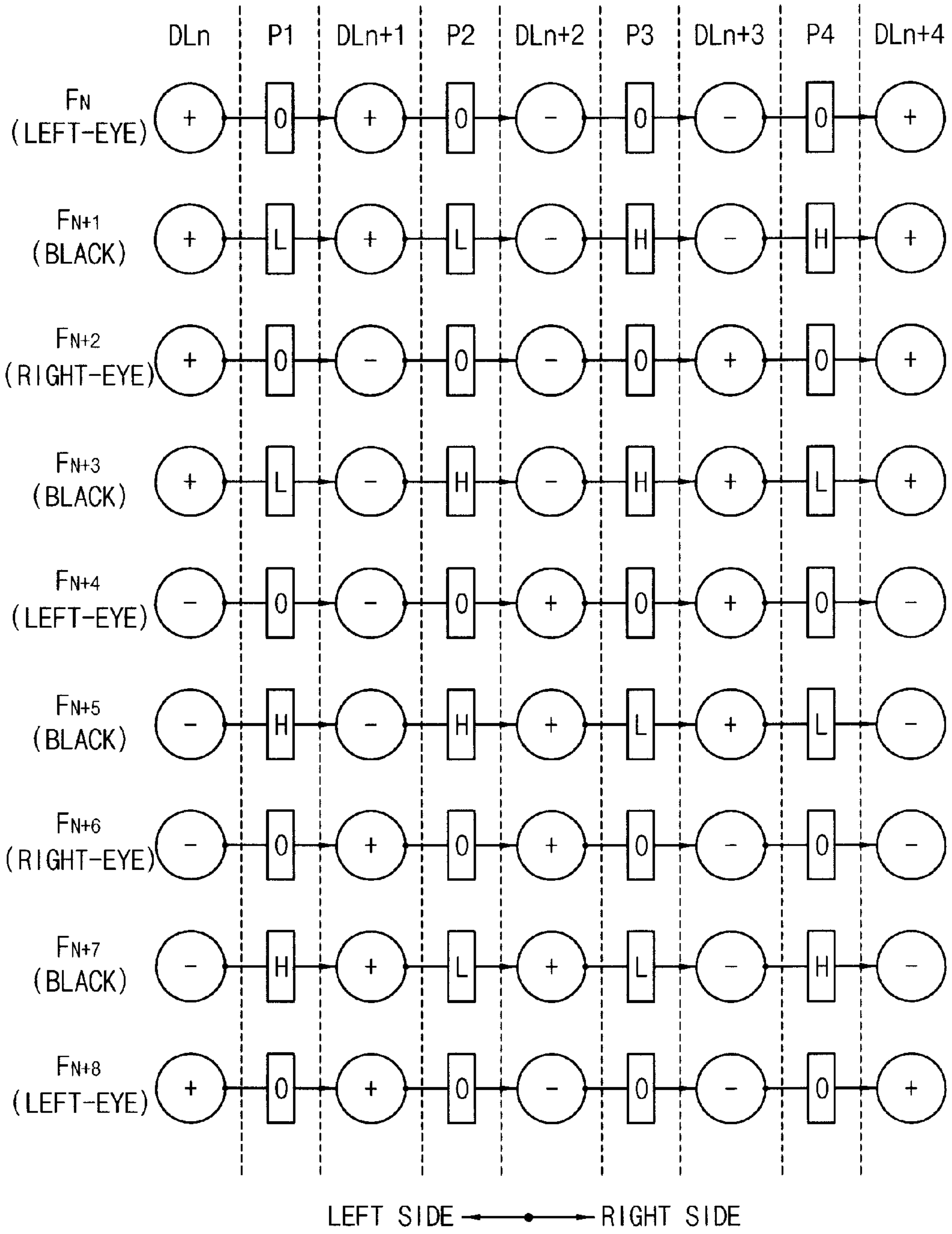
FIG. 18 is a schematic diagram explaining still another exemplary embodiment of a method of driving an exemplary display panel according to the present invention.

FIG. 18 is a schematic diagram explaining a still further exemplary embodiment of a method of driving an exemplary display panel according to the present invention.

Referring to FIG. 18, the display panel 400 displays a 3D image by sequentially repeating a left-eye image, a black image, a right-eye image and a black image. The data driving part 530 outputs a left-eye data voltage during an N-th frame $F_N$, and outputs a black data voltage during an (N+1)-th frame $F_{N+1}$. In addition, the data driving part 530 outputs a right-eye data voltage during an (N+2)-th frame $F_{N+2}$, and outputs a black data voltage during an (N+3)-th frame $F_{N+3}$. Using the above method, a left-eye data voltage, a black data voltage, a right-eye data voltage and a black data voltage are sequentially output during an (N+4)-th frame $F_{N+4}$, an (N+5)-th frame $F_{N+5}$, an (N+6)-th frame $F_{N+6}$ and an (N+7)-th frame $F_{N+7}$.

Moreover, the data driving part 530 applies voltages to the data lines in accordance with a two-frame left side shift inversion method. The data driving part 530 applies data voltages of polarities such as +, +, −, −, + to the data lines DLn, DLn+1, DLn+2, DLn+3 and DLn+4, respectively, (where 'n' is a natural number) during an N-th frame $F_N$ and an (N+1)-th frame $F_{N+1}$, and applies data voltages of polarities such as +, −, −, +, + to the data lines DLn, DLn+1, DLn+2, DLn+3 and DLn+4, respectively, during an (N+2)-th frame $F_{N+2}$ and (N+3)-th frame $F_{N+3}$ in accordance with a two-frame left side shift inversion method. Moreover, the data driving part 530 applies data voltages of polarities such as −, −, +, +, −, to the data lines DLn, DLn+1, DLn+2, DLn+3 and DLn+4, respectively, during an (N+4)-th frame $F_{N+4}$ and (N+5)-th frame $F_{N+5}$, and applies data voltages of polarities such as −, +, +, −, −, to the data lines DLn, DLn+1, DLn+2, DLn+3 and DLn+4, respectively, during an (N+6)-th frame $F_{N+6}$ and (N+7)-th frame $F_{N+7}$ in accordance with the two-frame left side shift inversion method.

As shown in FIG. 18, when it varies from an odd numbered frame to an even numbered frame, a polarity of voltages applied to the data lines DLn, DLn+1, DLn+2, DLn+3 and DLn+4 during an N-th frame $F_N$ and a polarity of voltages applied to the data lines DLn, DLn+1, DLn+2, DLn+3 and DLn+4 during an (N+1)-th frame $F_{N+1}$ are not varied, but constantly maintained. Thus, since polarities of voltages of the data lines DLn, DLn+1, DLn+2, DLn+3 and DLn+4 are not varied during a vertical blank interval between the N-th frame $F_N$ and the (N+1)-th frame $F_{N+1}$, polarities of the voltages of the first, second, third and fourth pixels P1, P2, P3 and P4 are not varied ("0").

When it varies from an even numbered frame to an odd numbered frame, data voltages of polarities such as +, +, −, −, + are applied to the data lines DLn, DLn+1, DLn+2, DLn+3 and DLn+4 during an (N+1)-th frame $F_{N+1}$, and data voltages of polarities such as +, −, −, +, + are applied to the data lines DLn, DLn+1, DLn+2, DLn+3 and DLn+4 during an (N+2)-th frame $F_{N+2}$. When it varies from an even numbered frame to an odd numbered frame, voltage variations of the first pixel P1, a second pixel P2, a third pixel P3 and a fourth pixel P4 may be substantially the same as those described with reference to FIG. 12, and thus any repetitive detailed description thereof will hereinafter be omitted.

As a result, a voltage variation of the first to fourth pixels P1, P2, P3 and P4 is not generated during a vertical blank interval between an odd numbered frame and an even numbered frame, and the number of pixels in which a voltage applied to a pixel electrode is shifted along a low direction 'L' is substantially equal to the number of pixels in which a voltage applied to a pixel electrode is shifted along a high direction 'H' during a vertical blank interval between an even numbered frame and an odd numbered frame. Thus, display defects such as a greenish phenomenon, vertical-line defects, etc., due to a voltage variation of a data line may be prevented.

Moreover, the left-eye data voltages outputted to the data lines DLn, DLn+1, DLn+2, DLn+3 and DLn+4 during an N-th frame $F_N$ have a polarity in a sequence of +, +, −, −, +, and the left-eye data voltages outputted to the data lines DLn, DLn+1, DLn+2, DLn+3 and DLn+4 during an (N+4)-th frame $F_{N+4}$ have a polarity in a sequence of −, −, +, +, −. Using the above method, the right-eye data voltages outputted to the data lines DLn, DLn+1, DLn+2, DLn+3 and DLn+4 during an (N+2)-th frame $F_{N+2}$ have a polarity in a sequence of +, −, −, +, +, and the right-eye data voltages outputted to the data lines DLn, DLn+1, DLn+2, DLn+3 and DLn+4 during an (N+6)-th frame $F_{N+6}$ have a polarity in a sequence of −, +, +, −, −.

Accordingly, polarities of left-eye data voltages are inverted in a predetermined period and polarities of right-eye data voltages are inverted in a predetermined period, so that it prevents an afterimage from being generated.

Figure 19:
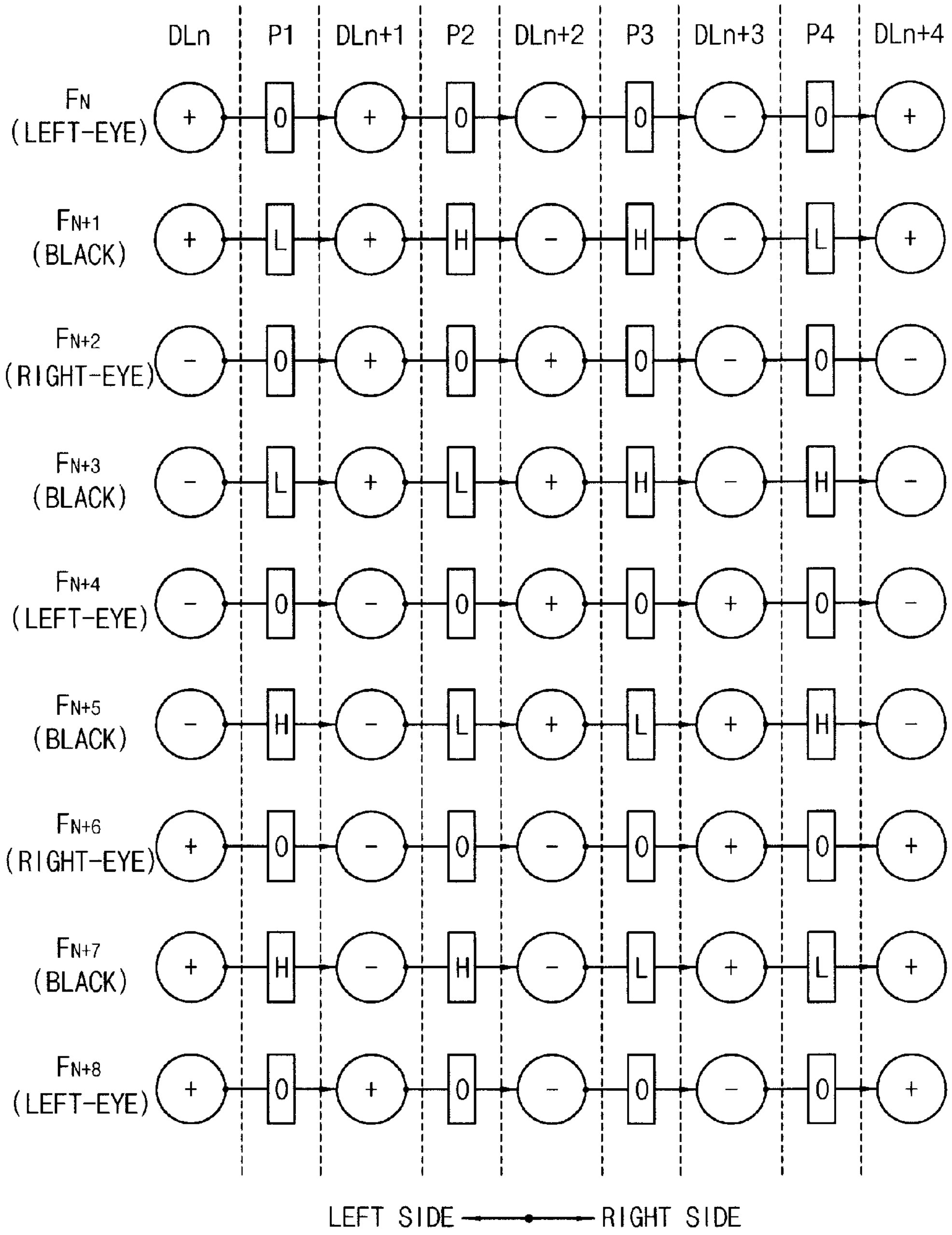
FIG. 19 is a schematic diagram explaining a further exemplary embodiment of a method of driving an exemplary display panel according to the present invention.

FIG. 19 is a schematic diagram explaining yet another exemplary embodiment of a method of driving an exemplary display panel according to the present invention.

Referring to FIG. 19, the display panel 400 displays a 3D image by sequentially repeating a left-eye image, a black image, a right-eye image and a black image. The data driving part 530 outputs a left-eye data voltage during an N-th frame $F_N$, and outputs a black data voltage during an (N+1)-th frame $F_{N+1}$. In addition, the data driving part 530 outputs a right-eye data voltage during an (N+2)-th frame $F_{N+2}$, and outputs a black data voltage during an (N+3)-th frame $F_{N+3}$. Using the above method, a left-eye data voltage, a black data voltage, a right-eye data voltage and a black data voltage are sequentially output during an (N+4)-th frame $F_{N+4}$, an (N+5)-th frame $F_{N+5}$, an (N+6)-th frame $F_{N+6}$ and an (N+7)-th frame $F_{N+7}$.

Moreover, the data driving part 530 applies voltages to the data lines in accordance with a two-frame right side shift inversion method. The data driving part 530 applies data voltages of polarities such as +, +, −, −, + to the data lines DLn, DLn+1, DLn+2, DLn+3 and DLn+4, respectively, (where 'n' is a natural number) during an N-th frame $F_N$ and an (N+1)-th frame $F_{N+1}$, and applies data voltages of polarities such as −, +, +, −, − to the data lines DLn, DLn+1, DLn+2, DLn+3 and DLn+4, respectively, during an (N+2)-th frame $F_{N+2}$ and (N+3)-th frame $F_{N+3}$ in accordance with a two-frame right side shift inversion method. Moreover, the data driving part 530 applies data voltages of polarities such as −, −, +, +, − to the data lines DLn, DLn+1, DLn+2, DLn+3 and DLn+4, respectively, during an (N+4)-th frame $F_{N+4}$ and (N+5)-th frame $F_{N+5}$, and applies data voltages of polarities such as +, −, −, +, + to the data lines DLn, DLn+1, DLn+2, DLn+3 and DLn+4, respectively, during an (N+6)-th frame $F_{N+6}$ and (N+7)-th frame $F_{N+7}$ in accordance with the two-frame right side shift inversion method.

As shown in FIG. 19, when it varies from an odd numbered frame to an even numbered frame, a polarity of voltages applied to the data lines DLn, DLn+1, DLn+2, DLn+3 and DLn+4 during an N-th frame $F_N$ and a polarity of voltages applied to the data lines DLn, DLn+1, DLn+2, DLn+3 and DLn+4 during an (N+1)-th frame $F_{N+1}$ are not varied, but constantly maintained. Thus, since polarities of voltages of the data lines DLn, DLn+1, DLn+2, DLn+3 and DLn+4 are not varied during a vertical blank interval between the N-th frame and the (N+1)-th frame, polarities of the voltages of the first, second, third and fourth pixels P1, P2, P3 and P4 are not varied ("0").

When it varies from an even numbered frame to an odd numbered frame, data voltages of polarities such as +, +, −, −, + are applied to the data lines DLn, DLn+1, DLn+2, DLn+3 and DLn+4 during an (N+1)-th frame $F_{N+1}$, and data voltages of polarities such as −, +, +, −, − are applied to the data lines DLn, DLn+1, DLn+2, DLn+3 and DLn+4 during an (N+2)-th frame $F_{N+2}$. When it varies from an even numbered frame to an odd numbered frame, voltage variations of the first pixel P1, a second pixel P2, a third pixel P3 and a fourth pixel P4 may be substantially the same as those described with reference to FIG. 15, and thus any repetitive detailed description thereof will hereinafter be omitted.

As a result, a voltage variation of the first to fourth pixels P1, P2, P3 and P4 is not generated during a vertical blank interval between an odd numbered frame and an even numbered frame, and the number of pixels in which a voltage applied to a pixel electrode is shifted along a low direction 'L' is substantially equal to the number of pixels in which a voltage applied to a pixel electrode is shifted along a high direction 'H' during a vertical blank interval between an even numbered frame and an odd numbered frame. Thus, display defects such as a greenish phenomenon, vertical-line defects, etc., due to a voltage variation of a data line may be prevented.

Moreover, the left-eye data voltages outputted to the data lines DLn, DLn+1, DLn+2, DLn+3 and DLn+4 during an N-th frame $F_N$ have a polarity in a sequence of +, +, −, −, +, and the left-eye data voltages outputted to the data lines DLn, DLn+1, DLn+2, DLn+3 and DLn+4 during an (N+4)-th frame $F_{N+4}$ have a polarity in a sequence of −, −, +, +, −. Using the above method, the right-eye data voltages outputted to the data lines DLn, DLn+1, DLn+2, DLn+3 and DLn+4 during an (N+2)-th frame $F_{N+2}$ have a polarity in a sequence of −, +, +, −, −, and the right-eye data voltages outputted to the data lines DLn, DLn+1, DLn+2, DLn+3 and DLn+4 during an (N+6)-th frame $F_{N+6}$ have a polarity in a sequence of +, −, −, +, +.

Accordingly, polarities of left-eye data voltages are inverted in a predetermined period and polarities of right-eye data voltages are inverted in a predetermined period, so that it prevents an afterimage from being generated.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of driving a display panel, the method comprising:

outputting a voltage of a first polarity with respect to a reference voltage to an n-th data line and an (n+1)-th data line ('n' is a natural number), respectively, and a voltage of a second polarity with respect to the reference voltage to an (n+2)-th data line and an (n+3)-th data line, respectively, during an N-th frame ('N' is a natural number); and outputting a voltage of the first polarity to the n-th data line, a voltage of the second polarity to the (n+1)-th data line and the (n+2)-th data line, respectively, and a voltage of the first polarity to the (n+3)-th data line, during an (N+1)-th frame.

2. The method of claim 1, further comprising:

outputting a voltage of the second polarity to the n-th data line and the (n+1)-th data line, respectively, and a voltage of the first polarity to the (n+2)-th data line and the (n+3)-th data line, respectively, during an (N+2)-th frame; and outputting a voltage of the second polarity to the n-th data line, a voltage of the first polarity to the (n+1)-th data line and the (n+2)-th data line, respectively, and a voltage of the second polarity to the (n+3)-th data line, during an (N+3)-th frame.

3. A method of driving a display panel, the method comprising:

outputting a voltage of a first polarity with respect to a reference voltage to an n-th data line and an (n+1)-th data line ('n' is a natural number), respectively, and a voltage of a second polarity with respect to the reference voltage to an (n+2)-th data line and an (n+3)-th data line, respectively, during an N-th frame and an (N+1)-th frame ('N' is a natural number); and outputting a voltage of the first polarity to the n-th data line, a voltage of the second polarity to the (n+1)-th data line and the (n+2)-th data line, respectively, and a voltage of the first polarity to the (n+3)-th data line, during an (N+2)-th frame and an (N+3)-th frame.

4. The method of claim 3, further comprising:

outputting a voltage of the second polarity to an n-th data line and an (n+1)-th data line, respectively, and a voltage of the first polarity to an (n+2)-th data line and an (n+3)-th data line, respectively, during an (N+4)-th frame and an (N+5)-th frame; and outputting a voltage of the second polarity to the n-th data line, a voltage of the first polarity to the (n+1)-th data line and the (n+2)-th data line, respectively, and a voltage of the second polarity to the (n+3)-th data line, during an (N+6)-th frame and an (N+7)-th frame.

5. The method of claim 4, wherein left eye data voltages are outputted during the N-th and (N+4)-th frames, black data voltages are outputted during the (N+1)-th and (N+5)-th frames, right eye data voltages are outputted during the (N+2)-th and (N+6)-th frames, and black data voltages are outputted during the (N+3)-th and (N+7)-th frames.

6. A display device comprising:

a display panel comprising a plurality of data lines, a plurality of gate lines crossing the data lines, and a plurality of pixels electrically connected to the data and gate lines; and a data driving part configured to output a voltage of a first polarity with respect to a reference voltage to an n-th data line and an (n+1)-th data line ('n' is a natural number), respectively, and to output a voltage of a second polarity with respect to the reference voltage to an (n+2)-th data line and an (n+3)-th data line, respectively, during an N-th frame ('N' is a natural number), and further configured to output a voltage of the first polarity to the n-th data line, to output a voltage of the second polarity to the (n+1)-th data line and the (n+2)-th data line, respectively, and to output a voltage of the first polarity to the (n+3)-th data line, during an (N+1)-th frame.

7. The display device of claim 6, wherein the data driving part is configured to output a voltage of the second polarity to the n-th data line and the (n+1)-th data line, respectively, and to output a voltage of the first polarity to the (n+2)-th data line and the (n+3)-th data line, respectively, during an (N+2)-th frame, and is further configured to output a voltage of the second polarity to the n-th data line, to output a voltage of the first polarity to the (n+1)-th data line and the (n+2)-th data line, respectively, and to output a voltage of the second polarity to the (n+3)-th data line, during an (N+3)-th frame.

8. The display device of claim 7, wherein the pixels are arranged in a plurality of pixel rows and a plurality of columns, and each of the pixels is alternatingly connected to two data lines that are disposed at two sides of the pixel columns.

9. The display device of claim 7, wherein the pixels are arranged in a plurality of pixel rows and a plurality of columns, and each of the pixels is electrically connected to a data line that is disposed at one side of the pixel columns.

10. The display device of claim 9, wherein the data driving part inverts a polarity of a data voltage with respect to the reference voltage per one horizontal period, and outputs the inverted polarity of the data voltage.

11. A display device comprising:

a display panel comprising a plurality of data lines, a plurality of gate lines crossing the data lines, and a plurality of pixels electrically connected to the data and gate lines; and a data driving part configured to output a voltage of a first polarity with respect to a reference voltage to an n-th data line and an (n+1)-th data line ('n' is a natural number), respectively, to output a voltage of a second polarity with respect to the reference voltage to an (n+2)-th data line and an (n+3)-th data line, respectively, during an N-th frame and an (N+1)-th frame ('N' is a natural number), and configured to output a voltage of the first polarity to the n-th data line, to output a voltage of the second polarity to the (n+1)-th data line and the (n+2)-th data line, respectively, and to output a voltage of the first polarity to the (n+3)-th data line, during an (N+2)-th frame and an (N+3)-th frame.

12. The display device of claim 11, wherein the data driving part is configured to output a voltage of the second polarity to an n-th data line and an (n+1)-th data line, respectively, to output a voltage of the first polarity to an (n+2)-th data line and an (n+3)-th data line, respectively, during an (N+4)-th frame and an (N+5)-th frame, and is further configured to output a voltage of the second polarity to the n-th data line, to output a voltage of the first polarity to the (n+1)-th data line and the (n+2)-th data line, respectively, and to output a voltage of the second polarity to the (n+3)-th data line, during an (N+6)-th frame and an (N+7)-th frame.

13. The display device of claim 12, wherein the pixels are arranged in a plurality of pixel rows and a plurality of columns, and each of the pixels is alternatingly connected to two data lines that are disposed at two sides of the pixel columns.

14. The display device of claim 13, wherein the data driving part is configured to output left eye data voltages during the N-th and (N+4)-th frames, to output black data voltages during the (N+1)-th and (N+5)-th frames, to output right eye data voltages during the (N+2)-th and (N+6)-th frames, and to output black data voltages during the (N+3)-th and (N+7)-th frames.

15. The display device of claim 12, wherein the pixels are arranged in a plurality of pixel rows and a plurality of columns, and each of the pixels is electrically connected to a data line that is disposed at one side of the pixel columns.

16. The display device of claim 15, wherein the data driving part is configured to output left eye data voltages during the N-th and (N+4)-th frames, to output black data voltages during the (N+1)-th and (N+5)-th frames, to output right eye data voltages during the (N+2)-th and (N+6)-th frames, and to output black data voltages during the (N+3)-th and (N+7)-th frames.

17. A display device comprising:

a display panel comprising a pixel column, the display panel including:

a plurality of data lines which is respectively arranged in different columns;

a plurality of connection lines each connecting two data lines arranged in different columns among the plurality of data lines; and a plurality of pixels within the pixel column disposed between the two data lines to be electrically connected to one of the two data lines; and a data driving part connected to output terminals of the connection lines to output data voltages to the connection lines and configured to output a voltage of a first polarity with respect to a reference voltage to an n-th data line and an (n+1)-th data line ('n' is a natural number), respectively, to output a voltage of a second polarity with respect to the reference voltage to an (n+2)-th data line and an (n+3)-th data line, respectively, during an N-th frame and an (N+1)-th frame ('N' is a natural number), and configured to output a voltage of the first polarity to the n-th data line, to output a voltage of the second polarity to the (n+1)-th data line and the (n+2)-th data line, respectively, and to output a voltage of the first polarity to the (n+3)-th data line, during an (N+2)-th frame and an (N+3)-th frame.

18. The display device of claim 17, wherein the data driving part inverts a polarity of the data voltage with respect to the reference voltage per one horizontal period.

19. The display device of claim 17, wherein the display panel further comprises a plurality of gate lines crossing the data lines, and each of the gate lines is electrically connected to a plurality of pixels forming a pixel row.

* * * * *